US006967446B2

(12) United States Patent
Hamaguchi et al.

(10) Patent No.: US 6,967,446 B2
(45) Date of Patent: Nov. 22, 2005

(54) HIGH PRESSURE DISCHARGE LAMP LIGHTING APPARATUS AND HIGH PRESSURE DISCHARGE LAMP LIGHTING METHOD

(75) Inventors: Takahisa Hamaguchi, Tokyo (JP); Hiroyasu Kisaichi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/481,638

(22) PCT Filed: Dec. 17, 2002

(86) PCT No.: PCT/JP02/13174

§ 371 (c)(1),
(2), (4) Date: Dec. 22, 2003

(87) PCT Pub. No.: WO03/059020

PCT Pub. Date: Jul. 17, 2003

(65) Prior Publication Data

US 2004/0178748 A1 Sep. 16, 2004

(30) Foreign Application Priority Data

Jan. 7, 2002 (JP) ............................ 2002-000509
Aug. 29, 2002 (JP) ............................ 2002-250159

(51) Int. Cl.[7] ............................................. H05B 37/02
(52) U.S. Cl. .................. 315/224; 315/308; 315/DIG. 7
(58) Field of Search ............................... 315/224–226, 315/291, 307–308, DIG. 5, DIG. 7, 209 R

(56) References Cited

U.S. PATENT DOCUMENTS 4,803,406 A * 2/1989 Yasuda et al. .............. 315/174
5,063,490 A * 11/1991 Maehara et al. .............. 363/37
5,491,386 A * 2/1996 Eriguchi et al. ........ 315/209 R
5,569,984 A 10/1996 Holtslag ..................... 315/307
5,623,187 A 4/1997 Caldeira et al. ............ 315/307
5,680,015 A 10/1997 Bernitz et al. .............. 315/291
5,773,937 A * 6/1998 Miyazaki et al. ........... 315/246
5,942,860 A * 8/1999 Huynh ....................... 315/307
6,324,078 B1 * 11/2001 Naruo et al. .................. 363/17

FOREIGN PATENT DOCUMENTS

EP 0 713 352 5/1996
JP 56-11895 A 2/1981
JP 60-235396 A 11/1985
JP 6-13187 A 1/1994

* cited by examiner

*Primary Examiner*—Thuy Vinh Tran
(74) *Attorney, Agent, or Firm*—Buchanan Ingersoll PC

(57) ABSTRACT

A high pressure discharge lamp lighting apparatus is provided which prevents dying out or instabilities of the discharge arc inside the arc tube due to the acoustic resonance phenomena and enables to light the high pressure discharge lamp in a steady state. In the high pressure discharge lamp lighting apparatus having the high pressure discharge lamp, the lamp voltage detecting device, the high frequency power supplying device, and the control circuit, the apparatus includes an extracting device for extracting an upper limit frequency and a lower limit frequency of the resonance-free frequency band, and the control circuit includes a frequency moving device for changing the frequency of the high frequency power within a range defined by the upper limit frequency and the lower limit frequency extracted by the extracting device and then moving the frequency to a predetermined frequency which is determined based on the upper limit frequency and the lower limit frequency.

17 Claims, 14 Drawing Sheets

HIGH PRESSURE DISCHARGE LAMP LIGHTING APPARATUS AND HIGH PRESSURE DISCHARGE LAMP LIGHTING METHOD

TECHNICAL FIELD

The present invention relates to a high pressure discharge lamp lighting apparatus for lighting a high pressure discharge lamp at high frequencies.

BACKGROUND ART

FIG. 17 shows a circuit configuration of a high pressure discharge lamp lighting apparatus of a conventional art. In FIG. 17, the high pressure discharge lamp lighting apparatus includes a direct current power source 1, a half bridge circuit 2 consisting of a first switching element 2*a* and a second switching element 2*b* for converting direct current voltage of the direct current power source 1 to high frequency voltage, a control circuit 3 for controlling ON/OFF operation of each switching element forming the half bridge circuit 2, a load circuit 4 including a resonant condenser 5, a chalk coil 6, and a starting circuit 7, and a high pressure discharge lamp 8 which is lit by the high frequency voltage supplied from the load circuit 4.

In the high pressure discharge lamp lighting apparatus including the above configuring elements, the operation of each switching component is controlled by the control circuit 3 so as to supply the high frequency voltage having equal to or greater than 1 kHz to the high pressure discharge lamp 8 via a load circuit 4. Further, the control circuit 3 controls the operation of each in order to prevent generation of acoustic resonance phenomena such as "dying out" or "instabilities" accompanied to a bend of a discharge arc inside an arc tube of the high pressure discharge lamp 8, which is well known.

The conventional lighting apparatus for a high pressure discharge lamp employs a configuration which lights the high pressure discharge lamp by setting the lighting frequency to the resonance-free frequency as discussed above. However, it is known to the public that the speed of sound wave within the arc tube changes according to an accumulated lighting time in the high pressure discharge lamp or that the resonance-free frequency band also changes as an electrode exhausts. Conventionally, there has been a problem the high pressure discharge lamp generates the acoustic resonance phenomena such as "dying out" or "instabilities" according to the bend of the discharge arc within the arc tube due to the above various reasons, which prevents the high pressure discharge lamp from keeping steady state lighting.

The present invention aims to solve the above problems and to provide the high pressure discharge lamp lighting apparatus, which always can prevent "dying out" and "instabilities" of the discharge arc within the arc tube even if the resonance-free frequency changes due to the above various factors, and can light the high pressure discharge lamp in a steady state at high frequencies.

DISCLOSURE OF THE INVENTION

According to the present invention, a high pressure discharge lamp lighting apparatus having:

a high pressure discharge lamp;

a lamp voltage detecting means for detecting a lamp voltage of the high pressure discharge lamp;

a high frequency power supplying means for supplying high frequency power to the high pressure discharge lamp;

a control circuit for controlling a frequency of the high frequency power supplied by the high frequency power supplying means, and wherein the high pressure discharge lamp lighting apparatus includes an extracting means for extracting an upper limit frequency and a lower limit frequency of resonance-free frequency band, the control circuit includes a frequency moving means for changing the frequency of the high frequency power in a range defined by the upper limit frequency and the lower limit frequency, and for moving the frequency to a frequency determined based on the upper limit frequency and the lower limit frequency.

Further, in a high pressure discharge lamp lighting apparatus having:

a high pressure discharge lamp;

a high frequency power supplying means for supplying high frequency power to the high pressure discharge lamp;

a control circuit for controlling a frequency of the high frequency power supplied by the high frequency power supplying means, the control circuit includes:

a frequency storing means for storing a first frequency of a point when a lamp voltage of the high pressure discharge lamp begins increasing in case that the frequency of the high frequency power is made decrease after the high pressure discharge lamp is lit at the predetermined frequency and a second frequency of a point when the lamp voltage of the high pressure discharge lamp begins increasing in case that the frequency of the high frequency power is made increase; and a frequency moving means for moving the frequency of the high frequency power to a third frequency which is determined based on the first frequency and the second frequency stored in the frequency storing means.

Further, in a high pressure discharge lamp lighting apparatus having:

a high pressure discharge lamp;

a high frequency power supplying means for supplying high frequency power to the high pressure discharge lamp;

a control circuit for controlling a frequency of the high frequency power supplied by the high frequency power supplying means, the control circuit includes:

a lamp voltage storing means for storing a lamp voltage of a point when the high pressure discharge lamp is lit at a predetermined frequency;

a frequency storing means for storing a first frequency of a point when the lamp voltage of the high pressure discharge lamp exceeds the lamp voltage stored in the lamp voltage storing means in case that the frequency of the high frequency power is made decrease and a second frequency of a point when the lamp voltage of the high pressure discharge lamp exceeds the lamp voltage stored in the lamp voltage storing means in case that the frequency of the high frequency power is made increase; and a frequency moving means for moving the frequency of the high frequency power to a third frequency which is determined based on the first frequency and the second frequency stored in the frequency storing means.

Further, the control circuit limits a moving range of a series of decreasing the frequency of the high frequency power after the high pressure discharge lamp is lit at a predetermined frequency, increasing the frequency of the high frequency power, and moving the frequency of the high frequency power to a lighting frequency which is determined based on the frequencies.

Further, the frequency moving means repeatedly performs a series of operation of moving the frequency of the high frequency power at a predetermined interval.

Further, the control circuit sets the predetermined frequency of the point when the high pressure discharge lamp is lit so as to match a lighting frequency of a previous lighting before turning-off.

Further, a high pressure discharge lamp lighting apparatus having:

a high pressure discharge lamp;

a lamp voltage detecting means for detecting a lamp voltage of the high pressure discharge lamp;

a high frequency power supplying means for supplying high frequency power to the high pressure discharge lamp;

a control circuit for controlling a frequency of the high frequency power supplied by the high frequency power supplying means, and wherein the high pressure discharge lamp lighting apparatus lights the high pressure discharge lamp in a steady state within a particular frequency range and a particular voltage range of a resonance-free region which is determined by the lamp voltage and a resonance-free frequency band corresponding the lamp voltage, the high pressure discharge lamp lighting apparatus includes a resonance strength detecting means for detecting rate of a instabilities of a discharge arc due to acoustic resonance phenomena based on a change of the lamp voltage detected by the lamp voltage detecting means, the high pressure discharge lamp applies a first frequency which is lower than a maximum frequency of the particular frequency range as a lighting frequency at lighting time, and when the resonance strength detecting means detects the instabilities of the discharge arc which exceeds a predetermined rate accompanied to increase of the lamp voltage after lighting, the control circuit increases the lighting frequency by a predetermined amount from the first frequency and switches the lighting frequency to a second frequency which belongs to the resonance-free region.

Further, when the resonance strength detecting means does not detect the instabilities of the discharge arc which exceeds the predetermined rate even if a predetermined time has passed since starting lighting operation, the control circuit forcibly switches the lighting frequency from the first frequency to the second frequency.

Further, a high pressure discharge lamp lighting apparatus having:

a high pressure discharge lamp;

a lamp voltage detecting means for detecting a lamp voltage of the high pressure discharge lamp;

a high frequency power supplying means for supplying high frequency power to the high pressure discharge lamp;

a control circuit for controlling a frequency of the high frequency power supplied by the high frequency power supplying means, and wherein the high pressure discharge lamp lighting apparatus lights the high pressure discharge lamp in a steady state within a particular frequency range and a particular voltage range of a resonance-free region which is determined by the lamp voltage and a resonance-free frequency band corresponding the lamp voltage, the high pressure discharge lamp lighting apparatus includes a resonance strength detecting means for detecting rate of instabilities of a discharge arc due to acoustic resonance phenomena based on a change of the lamp voltage detected by the lamp voltage detecting means, the high pressure discharge lamp applies a first frequency which is lower than a maximum frequency of the particular frequency range as a lighting frequency at lighting time, and when the lamp voltage detecting means detects one of that the lamp voltage exceeds a predetermined value after lighting and that a predetermined time has passed since a lighting operation has started, the control circuit increases the lighting frequency by a predetermined amount from the first frequency and switches the lighting frequency to a second frequency which belongs to the resonance-free region.

Further, after switching the lighting frequency from the first frequency to the second frequency, the control circuit gradually or continuously decrease the second frequency in respect of an increase of the lamp voltage.

Further, a high pressure discharge lamp lighting apparatus having:

a high pressure discharge lamp;

a lamp voltage detecting means for detecting a lamp voltage of the high pressure discharge lamp;

a high frequency power supplying means for supplying high frequency power to the high pressure discharge lamp;

a control circuit for controlling a frequency of the high frequency power supplied by the high frequency power supplying means, and wherein the high pressure discharge lamp lighting apparatus lights the high pressure discharge lamp in a steady state within a particular frequency range and a particular voltage range of a resonance-free region which is determined by the lamp voltage and a resonance-free frequency band corresponding the lamp voltage, the high pressure discharge lamp lighting apparatus includes a resonance strength detecting means for detecting rate of instabilities of a discharge arc due to acoustic resonance phenomena based on a change of the lamp voltage detected by the lamp voltage detecting means, the high pressure discharge lamp applies a first frequency which is lower than a maximum frequency of the particular frequency range as a lighting frequency at lighting time, and when the resonance strength detecting means detects the instabilities of the discharge arc which exceeds a predetermined rate according to increase of the lamp voltage after lighting, the control circuit decreases the lighting frequency by a predetermined amount from the first frequency and switches the lighting frequency to a second frequency which belongs to the resonance-free region and makes the second frequency gradually or continuously decrease in respect of the increase of the lamp voltage within the resonance-free region.

Further, a high pressure discharge lamp lighting apparatus having:

a high pressure discharge lamp;

a lamp voltage detecting means for detecting a lamp voltage of the high pressure discharge lamp;

a high frequency power supplying means for supplying high frequency power to the high pressure discharge lamp;

a control circuit for controlling a frequency of the high frequency power supplied by the high frequency power supplying means, and wherein the high pressure discharge lamp lighting apparatus lights the high pressure discharge lamp in a steady state within a particular frequency range and a particular voltage range of a resonance-free region which is determined by the lamp voltage and a resonance-free frequency band corresponding the lamp voltage, the high pressure discharge lamp lighting apparatus includes a resonance strength detecting means for detecting rate of instabilities of a discharge arc due to acoustic resonance phenomena based on a change of the lamp voltage detected by the lamp voltage detecting means, the high pressure discharge lamp applies a first frequency which is lower than a maximum frequency of the particular frequency range as a lighting frequency at lighting time, when the lamp voltage detecting means detects one of that the lamp voltage exceeds a predetermined value after lighting and that a predetermined time has passed since a lighting operation has started, and when the resonance strength detecting means detects the instabilities of the discharge arc which exceeds a predetermined rate according to increase of the lamp voltage after lighting, the control circuit decreases the lighting frequency by a predetermined amount from the first frequency and switches the lighting frequency to a second frequency which belongs to the resonance-free region and makes the second frequency gradually or continuously decrease in respect of the increase of the lamp voltage within the resonance-free region.

Further, the control circuit performs an operation of gradually decreasing the second frequency by repeatedly decreasing the lighting frequency by a predetermined amount when the resonance strength detecting means detects the instabilities of the discharge arc which exceeds the predetermined rate accompanied to an increase of the lamp voltage.

Further, the control circuit performs an operation of gradually decreasing the second frequency by decreasing the lighting frequency and then repeatedly increasing the lighting frequency by the predetermined amount with a predetermined interval when the resonance strength detecting means detects the instabilities of the discharge arc which exceeds the predetermined rate accompanied to a decrease of the tube lighting frequency.

Further, the control circuit performs an operation of continuously decreasing the second frequency by controlling to decrease the lighting frequency with approximately fixed changing rate in respect of an increase of the lamp voltage.

Yet further, a high pressure discharge lamp lighting apparatus having:

a high pressure discharge lamp;

a lamp voltage detecting means for detecting a lamp voltage of the high pressure discharge lamp;

a high frequency power supplying means for supplying high frequency power to the high pressure discharge lamp;

a control circuit for controlling a frequency of the high frequency power supplied by the high frequency power supplying means, and wherein the high pressure discharge lamp lighting apparatus lights the high pressure discharge lamp in a steady state within a particular frequency range and a particular voltage range of a resonance-free region which is determined by the lamp voltage and a resonance-free frequency band corresponding to the lamp voltage, the high pressure discharge lamp applies a first frequency which is higher than a maximum frequency of the particular frequency range as a lighting frequency and decreases the lighting frequency at approximately fixed rate so as to stay within the resonance-free region in respect of an increase of the lamp voltage.

According to the present invention, a method for a high pressure discharge lamp lighting having:

a high pressure discharge lamp;

a lamp voltage detecting step for detecting a lamp voltage of the high pressure discharge lamp;

a high frequency power supplying step for supplying high frequency power to the high pressure discharge lamp;

a control step for controlling a frequency of the high frequency power supplied by the high frequency power supplying means, the method includes an extracting step for extracting an upper limit frequency and a lower limit frequency from a resonance-free frequency band, and the control step changes a frequency of the high frequency power within a range defined by the upper limit frequency and the lower limit frequency of the resonance-free frequency band extracted by the extracting means, and then moves to a predetermined frequency which is determined based on the upper limit frequency and the lower limit frequency.

PREFERRED EMBODIMENTS FOR CARRYING OUT THE INVENTION

Embodiment 1.

Figure 1:
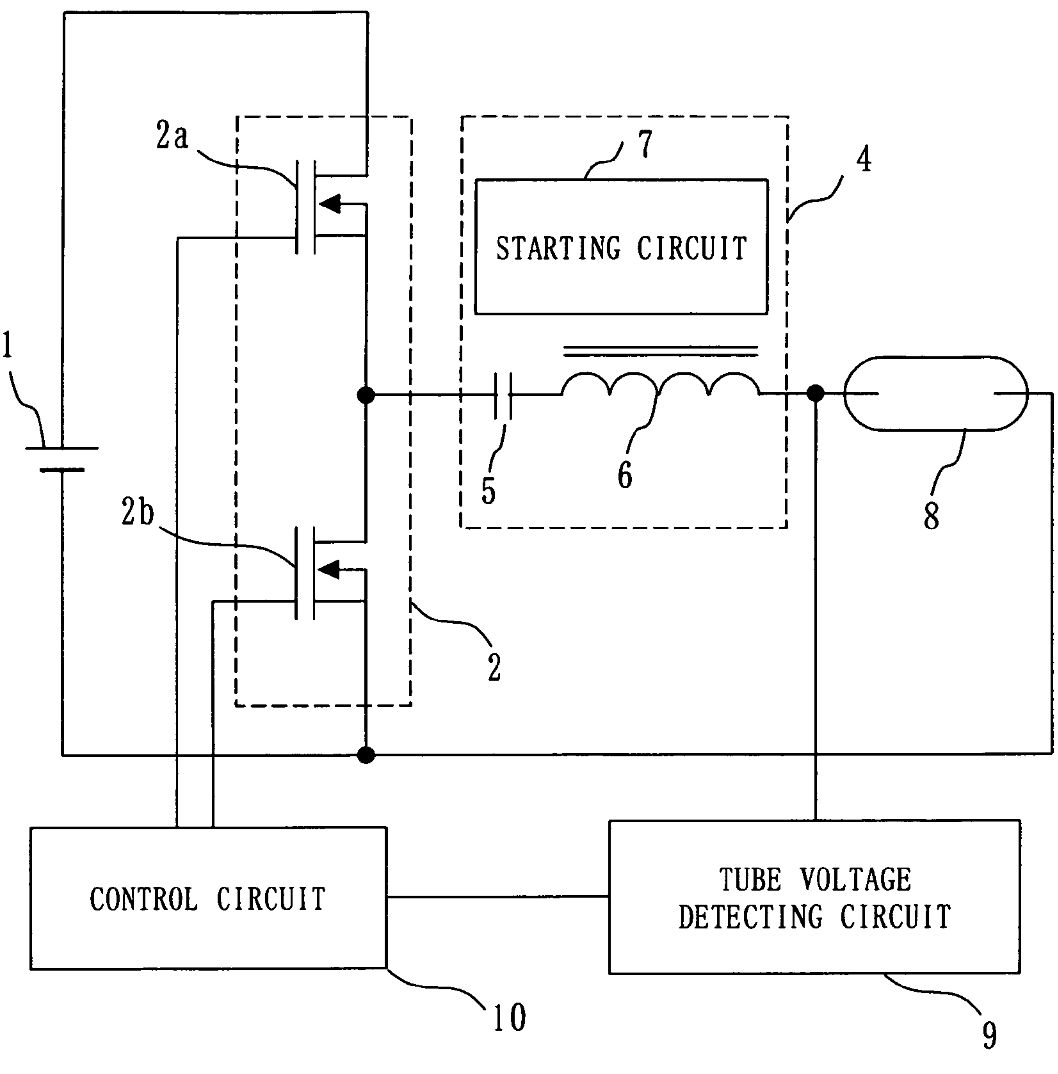
FIG. 1 shows a circuit configuration of a high pressure discharge lamp lighting apparatus according to the first embodiment of the present invention.

FIG. 1 shows a circuit configuration of a high pressure discharge lamp lighting apparatus according to the first embodiment. Different from the conventional apparatus, in FIG. 1, the high pressure discharge lamp lighting apparatus includes a lamp voltage detecting circuit 9 and a control circuit 10. The lamp voltage detecting circuit 9 detects a lamp voltage of a high pressure discharge lamp 8. The control circuit 10 extracts resonance-free frequency that does not generate acoustic resonance phenomena from a value (a value of the lamp voltage) detected by the lamp voltage detecting circuit 9 and controls the operational frequencies of switching elements 2*a* and 2*b* composing a half bridge circuit 2 so that the lighting frequency matches the extracted resonance-free frequency.

The lighting operation of the high pressure discharge lamp lighting apparatus having the above configuration will be explained by referring to the circuit configuration of FIG. 1 and a flow chart showing the flow of the operation of FIG. 2. In case that the operation of the lighting apparatus is started (at step S100), on starting lighting the high pressure discharge lamp 8, the control circuit 10 previously controls the operational frequency of each switching element composing the half bridge circuit 2 so that an initial lighting frequency f0 matches the resonance-free frequency fx and lights the high pressure discharge lamp 8 (at step S101). Then, the control circuit 10 decreases the lighting frequency by changing the operational frequencies of the switching elements 2*a* and 2*b* (at step S102). The control circuit 10 observes the values detected by the lamp voltage detecting circuit 9.

The control circuit 10 judges if the detected value of the lamp voltage detecting circuit 9, namely, the lamp voltage of the high pressure discharge lamp 8 starts increasing (at step S103). Here, when the lighting frequency becomes close to the acoustic resonant frequency band that generates the acoustic resonance phenomena, the lamp voltage of the high pressure discharge lamp 8 increases. For this reason, when the lamp voltage of the high pressure discharge lamp 8 does not increase (NO at step S103), the control circuit 10 further decreases the lighting frequency (at step S102), and the above operation is repeated. On the other hand, when the fact that the lamp voltage of the high pressure discharge lamp 8 increases is detected (YES at step S103), the control circuit 10 stops decreasing the lighting frequency and records the lighting frequency f1 at this time (at step S104).

Next, the control circuit 10 increases the lighting frequency from f1 as a basic point in the above operation (at step S105) and observes the values detected by the lamp voltage detecting circuit 9. The control circuit 10 judges if the lamp voltage of the high pressure discharge lamp 8 detected by the lamp voltage detecting circuit 9 starts increasing (at step S106). When the lamp voltage of the high pressure discharge lamp 8 does not increase, the control circuit 10 further increases the lighting frequency (at step S105), and the above operation is repeated. On the other hand, when the fact that the lamp voltage of the high pressure discharge lamp 8 increases is detected, the control circuit 10 stops increasing the lighting frequency and records the lighting frequency f2 at this time (at step S107).

Next, the control circuit 10 obtains an intermediate frequency fx by an equation fx=(f1+f2)/2 using the two lighting frequencies f1 and f2 which have been recorded above. The control circuit 10 controls the operation of each switching element of the half bridge circuit 2 so that the lighting frequency becomes the calculated lighting frequency fx and lights the high pressure discharge lamp 8 (at step S108). Because of this, it becomes possible to light the high pressure discharge lamp 8 in the resonance-free frequency band. And then, the control circuit 10 judges if the operation of the lighting apparatus finishes or not (at step S109). Here, when the control circuit 10 judges the operation has not been finished and a signal to turn off the light is not sent to the lighting apparatus (NO at the step S109), the control circuit 10 keeps lighting of the high pressure discharge lamp 8 at the lighting frequency fx.

After a predetermined interval (at step S110), the control circuit 10 changes the operational frequency of the half bridge circuit 2 again to decrease the lighting frequency from fx as a basic point (at step S102). Hereinafter, the above operations (from step S103 through S110) are repeated sequentially. When it is judged that the turning-off signal has been sent to the lighting apparatus (YES at step S109), the operation of the lighting apparatus terminates (at step 111). By these operation for lighting, a band in which the lamp voltage of the high pressure discharge lamp 8 is always low is extracted, which enables to make the lighting frequency match the resonance-free frequency.

Figure 2:
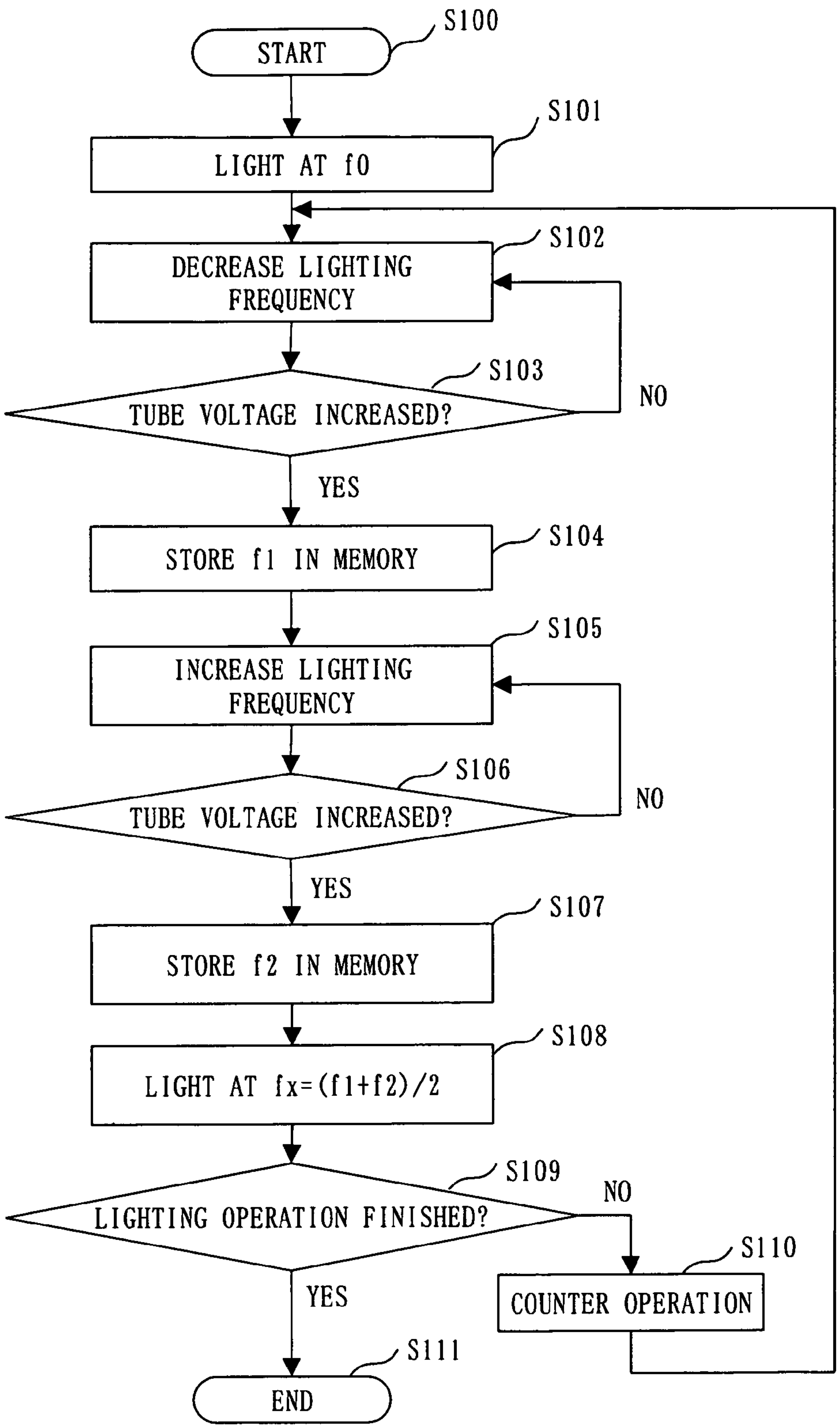
FIG. 2 is a flow chart showing a flow of an operation of the high pressure discharge lamp lighting apparatus of the first embodiment.

Here, in the flowchart of FIG. 2, the control circuit 10 memorizes the above lighting frequency fx directly before the completion (at step S111) of the lighting operation in a non-volatile memory stored in the control circuit 10. And then, the control circuit 10 can perform the lighting operation using the lighting frequency fx by reading the lighting frequency fx from the non-volatile memory at starting time of the next lighting operation (at step S100). This can be applied to the second embodiment, which will be discussed below.

Figure 3:
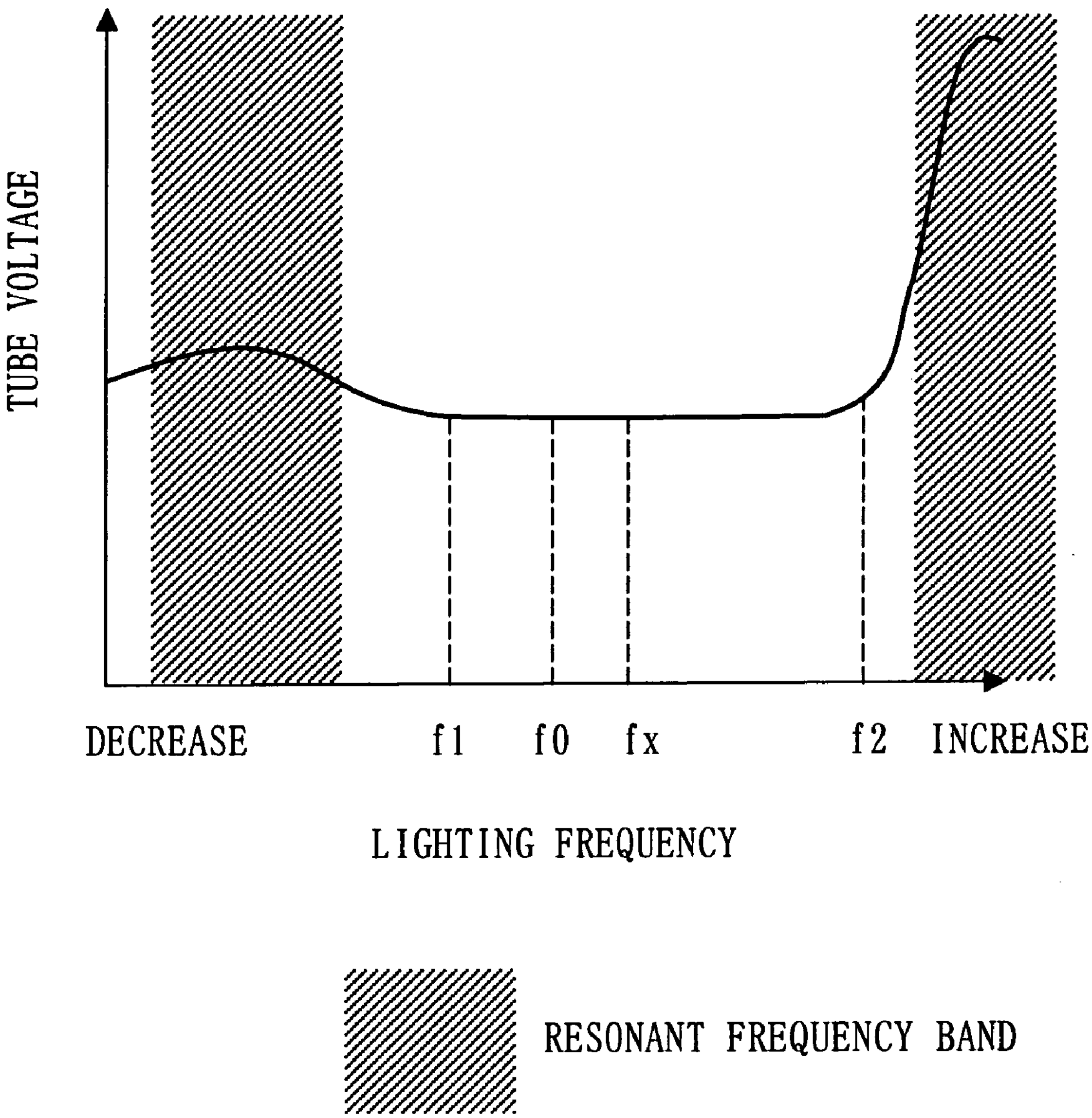
FIG. 3 is a timing chart showing a timing of the operation of the high pressure discharge lamp lighting apparatus of the first embodiment.

The lighting operation of the high pressure discharge lamp lighting apparatus will be explained by referring to FIGS. 3 and 4, which are timing charts showing characteristics of the lamp voltage in respect of the decrease/increase of the lighting frequency. FIG. 3 shows an example of characteristics of the high pressure discharge lamp 8, in which the lamp voltage in respect of the decrease/increase of the lighting frequency in the resonance-free frequency band is low and the frequency band to keep a predetermined level is wide. In FIG. 3, at starting lighting operation of the high pressure discharge lamp 8, the control circuit 10 lights the lamp by setting the lighting frequency to f0 which matches to the resonance-free frequency, and then decreases the lighting frequency. At a point when the lighting frequency is f1, the lamp voltage begins to increase, and the control circuit 10 stops changing the lighting frequency.

Next, by increasing the lighting frequency from f1 as a basic point, the lamp voltage begins to increase at the point when the lighting frequency is f2, and the control circuit 10 stops changing the lighting frequency. Subsequently, at the point when the lighting frequency is fx between the lighting frequencies f1 and f2 in the frequency band, namely, an intermediate point of the resonance-free frequency band, the control circuit 10 continues the lighting operation of the high pressure discharge lamp 8 for a predetermined time. Then, by increasing the lighting frequency after decreasing again from fx as the basic point, the control circuit 10 controls to light the high pressure discharge lamp 8 around the intermediate point of the resonance-free frequency band of the frequency band, in which the lamp voltage is always low and the predetermined level is kept. The time required for changing the lighting frequency from f0 as the basic point to f1, from f1 to f2, from f2 to fx can vary as long as it is visually unrecognizable.

Figure 4:
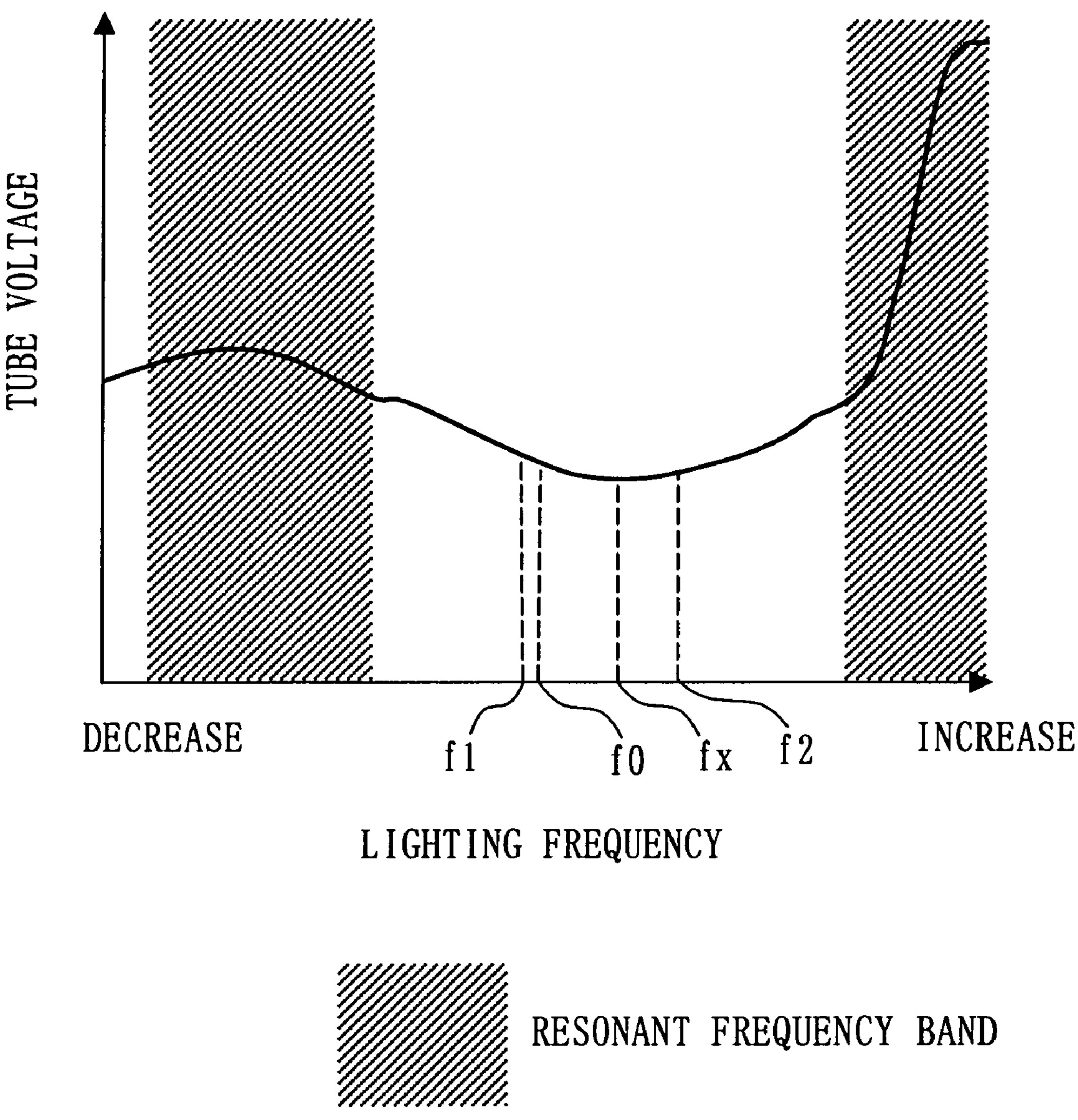
FIG. 4 is a timing chart showing a timing of another operation of the high pressure discharge lamp lighting apparatus of the first embodiment.

FIG. 4 shows an example of characteristics of the high pressure discharge lamp 8, in which the lamp voltage in respect of the decrease/increase of the lighting frequency in the resonance-free frequency band is low and the frequency band to keep a predetermined level is rare. In FIG. 4, at starting the lighting operation of the high pressure discharge lamp 8, the control circuit 10 lights the lamp by setting the lighting frequency to f0 and then changes the lighting frequency by decreasing it. At a point when the lighting frequency is f1, which is close to f0, the lamp voltage begins to increase, and the control circuit 10 stops changing the lighting frequency. Next, by increasing the lighting frequency from f1 as a basic point, the lamp voltage begins to increase at the point when the lighting frequency is f2, and the control circuit 10 stops changing the lighting frequency. Subsequently, at the point when the lighting frequency is fx between the lighting frequencies f1 and f2 in the frequency band, namely, an intermediate point of the resonance-free frequency band, the control circuit 10 continues the lighting operation of the high pressure discharge lamp 8 for the predetermined time. Hereinafter, the operation will be the same as discussed above. In this way, the high pressure discharge lamp 8 can be always lit at the intermediate point of the resonance-free frequency band.

In another way, the control circuit 10 can set the lighting frequency to f0 at the time of starting the lighting operation, and then the control circuit 10 can set a changing rate to decrease/increase the lighting frequency by indicating the range with percentage to the lighting frequency f0 such as ± some %.

In the above description of the operation, the lighting frequency is decreased and then increased; however, the lighting frequency can be increased and then decreased. This can be applied to the second and the third embodiments, which will be discussed below.

As has been described, based on the lamp voltage of the high pressure discharge lamp 8, the resonance-free frequency band is extracted, and the light is lit at the lighting frequency fx, which is an intermediate point of the extracted band. Accordingly, even if the resonance-free frequency band is moved by, for example, aging of the high pressure discharge lamp 8, it is always possible to prevent generation of "dying out" or "instabilities" of the discharge arc and to light the high pressure discharge lamp 8 in a steady state.

In this way, according to the present embodiment, the high pressure discharge lamp lighting apparatus and the high pressure discharge lamp lighting method having: the high pressure discharge lamp; the lamp voltage detecting means for detecting the lamp voltage of the high pressure discharge lamp; the high frequency power supplying means for supplying the high frequency power to the high pressure discharge lamp; and the control circuit 10 for controlling the frequency of the high frequency power supplied by the high frequency power supplying means, the apparatus and the method includes an extracting means for extracting an upper limit frequency and a lower limit frequency of the non-resonance frequency band, and the control circuit 10 includes a frequency moving means for changing the frequency of the high frequency power within a range between the upper limit frequency and the lower limit frequency of the resonance-free frequency band extracted by the extracting means, and then moving the frequency to a predetermined frequency decided based on the upper limit frequency and the lower limit frequency. Accordingly, even if the resonance-free frequency band is moved by, for example, aging of the high pressure discharge lamp, it is possible to supply the high frequency power having the intermediate frequency of the range to the high pressure discharge lamp, which prevents generation of "dying out" or "instabilities" of the discharge arc inside the arc tube and enables to light the high pressure discharge lamp in a steady state.

Further, in the high pressure discharge lamp lighting apparatus having the high pressure discharge lamp; the high frequency power supplying means; and the control circuit 10 for controlling the frequency of the high frequency power supplied by the high frequency power supplying means, the control circuit 10 includes a frequency memorizing means for memorizing a first frequency at a point when the lamp voltage of the high pressure discharge lamp begins to increase when the control circuit 10 decreases the frequency of the high frequency power after lighting the high pressure discharge lamp with the predetermined frequency and a second frequency at a point when the lamp voltage of the high pressure discharge lamp begins to increase when the control circuit 10 increases the frequency of the high frequency power; and a frequency moving means for moving the frequency of the high frequency power to a third frequency determined based on the first frequency and the second frequency memorized in the frequency memorizing means. Accordingly, even if the resonance-free frequency band is moved by aging of the high pressure discharge lamp, etc. it is always possible to supply the high frequency power having the intermediate frequency of the range to the high pressure discharge lamp, which prevents generation of "dying out" or "instabilities" of the discharge arc inside the arc tube and enables to light the high pressure discharge lamp in a steady state.

Further, the frequency moving means repeatedly performs a series of operations for moving the frequency of the high frequency power with a predetermined interval, which enables to always prevent generation of acoustic resonance phenomena even if the resonance-free frequency band is moved and to light the high pressure discharge lamp in a steady state.

Further, the control circuit 10 is configured so that the predetermined frequency at the time of lighting the high pressure discharge lamp matches to the lighting frequency before the previous turn-off, which enables to prevent generation of "dying out" or "instabilities" of the discharge arc inside the arc tube and enables to light the high pressure discharge lamp in a steady state.

Embodiment 2.

Figure 5:
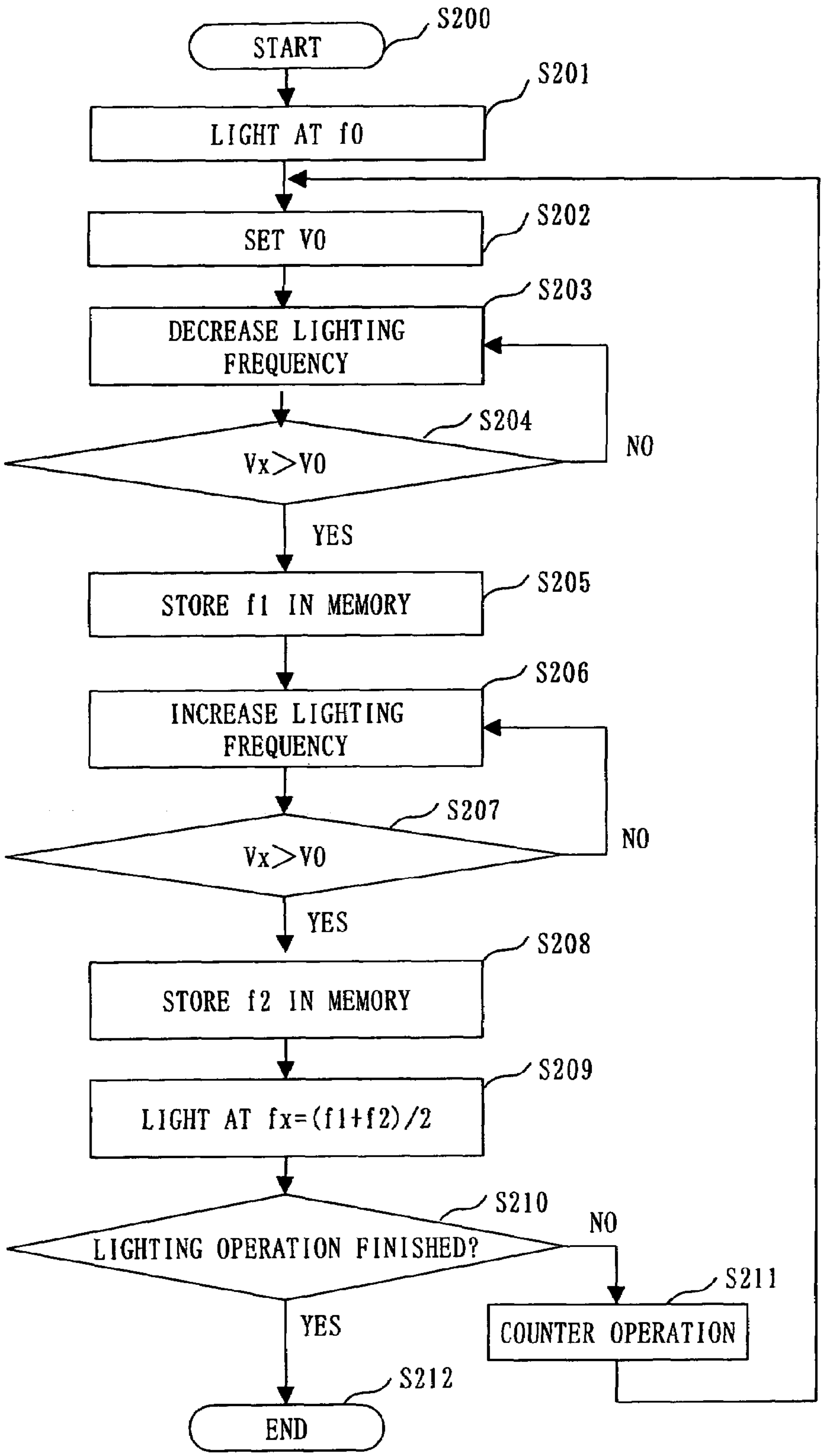
FIG. 5 is a flow chart showing a flow of an operation of the high pressure discharge lamp lighting apparatus of the second embodiment.

FIG. 5 is a flowchart showing an operation flow of the high pressure discharge lamp according to the second embodiment. Here, the circuit configuration of the high pressure discharge lamp lighting apparatus is the same as one of the first embodiment.

Next, a lighting operation of the high pressure discharge lamp having the above configuration will be explained by referring to the flowchart of FIG. 5. In case of starting the operation of the lighting apparatus (at step S200), on starting lighting the high pressure discharge lamp 8, the control circuit 10 sets an initial lighting frequency f0 so as to match the resonance-free frequency fx and lights the high pressure discharge lamp 8 (at step S201). And the control circuit 10 lights the high pressure discharge lamp 8 at the lighting frequency f0 and sets the lamp voltage V0 at this time. Afterwards, the control circuit 10 decreases the lighting frequency (at step S203) and observes a value detected by the lamp voltage detecting circuit 9.

Next, the control circuit 10 judges if the value detected by the lamp voltage detecting circuit 9, namely, the increased lamp voltage Vx of the high pressure discharge lamp 8 is larger than the lamp voltage V0 or not (at step S204). When the lamp voltage Vx is judged to be smaller than the lamp voltage V0 (NO at step S204), the control circuit 10 continues to change the lighting frequency by decreasing it (at step S203). When the lamp voltage Vx is judged to be larger than the lamp voltage V0 (YES at step S204), the control circuit 10 assumes that the lighting frequency becomes close to the acoustic resonant frequency band that is out of the resonance-free frequency band and stops changing the lighting frequency by decreasing it. Then, the control circuit 10 memorizes the lighting frequency f1 at this time (at step S205).

Subsequently, the control circuit 10 changes the lighting frequency by increasing it (at step S206) and judges if the lamp voltage Vx is larger than the lamp voltage V0 or not (at step S207). In case of NO at step S207, the control circuit 10 assumes the lamp voltage Vx is smaller than the lamp voltage V0 and continues to change the lighting frequency (at step S206). In case of YES at step S207, the control circuit 10 assumes that the lighting frequency becomes close to the acoustic resonant frequency region by the fact that the lamp voltage Vx is larger than the lamp voltage V0 and stops changing the lighting frequency by increasing it. Then, the control circuit 10 memorizes the lighting frequency f2 at this time (at step S208). Next, the control circuit 10 obtains an intermediate frequency fx between the lighting frequencies f1 and f2 by calculating an equation, fx=(f1+f2)/2 and lights the high pressure discharge lamp 8 with this frequency fx (at step S209). Hereinafter, the operations (steps S210 through 212) are the same as one of the first embodiment and an explanation is omitted.

Figure 6:
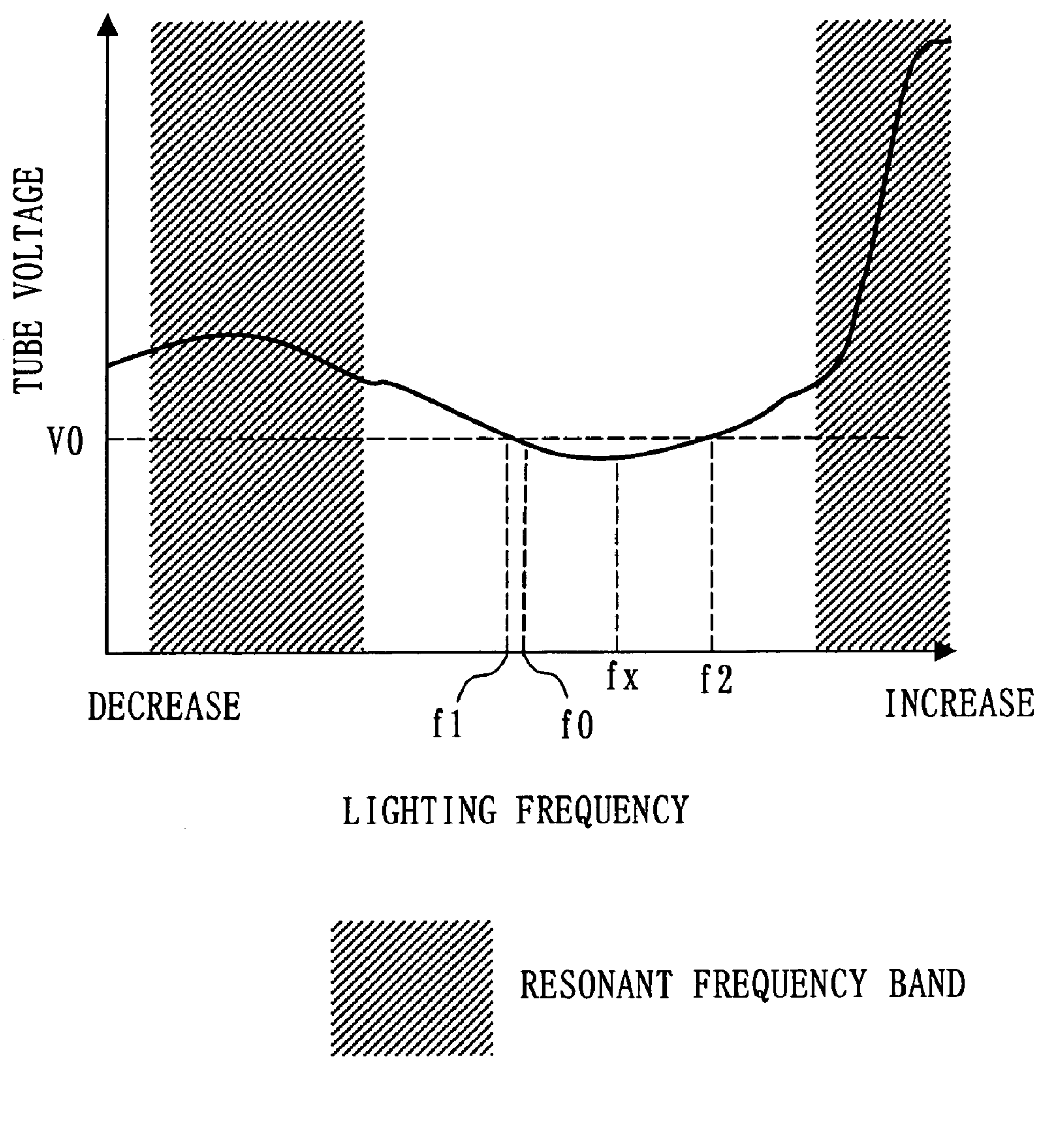
FIG. 6 is a timing chart showing a timing of the operation of the high pressure discharge lamp lighting apparatus of the second embodiment.

The operation will be explained by referring to FIG. 6, which is a timing chart showing characteristics of the lamp voltage in respect of the decrease/increase of the lighting frequency. FIG. 6 shows an example of characteristics of the high pressure discharge lamp 8, in which the lamp voltage is low and the frequency band to keep a predetermined level of lighting is little. In FIG. 6, the control circuit 10 lights the high pressure discharge lamp 8 at the lighting frequency f0 and then changes the lighting frequency by decreasing it. Just after starting decreasing the lighting frequency, at a point when the lighting frequency is f1, the lamp voltage Vx begins to exceed the lamp voltage V0, and the control circuit 10 stops changing the lighting frequency. Next the control circuit 10 increases the lighting frequency from f1 as a basic point. Then, the lamp voltage Vx begins to exceed the lamp voltage V0 at the point when the lighting frequency is f2, and the control circuit 10 stops changing the lighting frequency.

Subsequently, at the point when the lighting frequency is fx, namely, an intermediate point of the lighting frequencies f1 and f2 in the resonance-free region, the control circuit 10 continues the lighting operation of the high pressure discharge lamp 8 for the predetermined time. And then, the control circuit 10 stops decreasing the lighting frequency when the lamp voltage Vx begins to exceed the lamp voltage V0, which is the lamp voltage value when the lighting frequency is fx, during the process of decreasing the lighting frequency again from the lighting frequency fx as the basic point. Hereinafter, the control circuit 10 changes the lighting frequency in the same manner as discussed above. By changing the lighting frequency with decreasing/increasing it, the operation is controlled so as to light the high pressure discharge lamp 8 at the intermediate point of the resonance-free frequency band, namely, at the point when the lamp voltage is the lowest.

Applying the above control method for decreasing/increasing the lighting frequency, the lighting apparatus is configured to light the lamp at the intermediate lighting frequency fx of the resonance-free frequency band, so that it is always possible to light the high pressure discharge lamp 8 in a steady state even if the resonance-free frequency band is moved due to the aging of the high pressure discharge lamp 8, etc.

In this way, according to the present embodiment, in the high pressure discharge lamp lighting apparatus and the high pressure discharge lamp lighting method having the high pressure discharge lamp; the high frequency power supplying means for supplying the high frequency power to the high pressure discharge lamp; and the control circuit for controlling the frequency of the high frequency power supplied by the high frequency power supplying means, the control circuit includes a lamp voltage storing means for storing the lamp voltage of the time when the high pressure discharge lamp is lit at the predetermined frequency, a frequency storing means for storing a first frequency at a point when the lamp voltage of the high pressure discharge lamp begins to exceed the lamp voltage stored by the lamp voltage storing means when the control circuit decreases the frequency of the high frequency power and a second frequency at a point when the lamp voltage of the high pressure discharge lamp begins to exceed the lamp voltage stored by the lamp voltage storing means when the control circuit increases the frequency of the high frequency power; and a frequency moving means for moving the frequency of the high frequency power to a third frequency determined based on the first frequency and the second frequency stored in the frequency storing means. Accordingly, even if the resonance-free frequency band is moved due to the aging of the high pressure discharge lamp, etc. it is possible to prevent “dying out” or “instabilities” of the discharge arc inside the arc tube and to light the high pressure discharge lamp in a steady state.

Embodiment 3.

Figure 7:
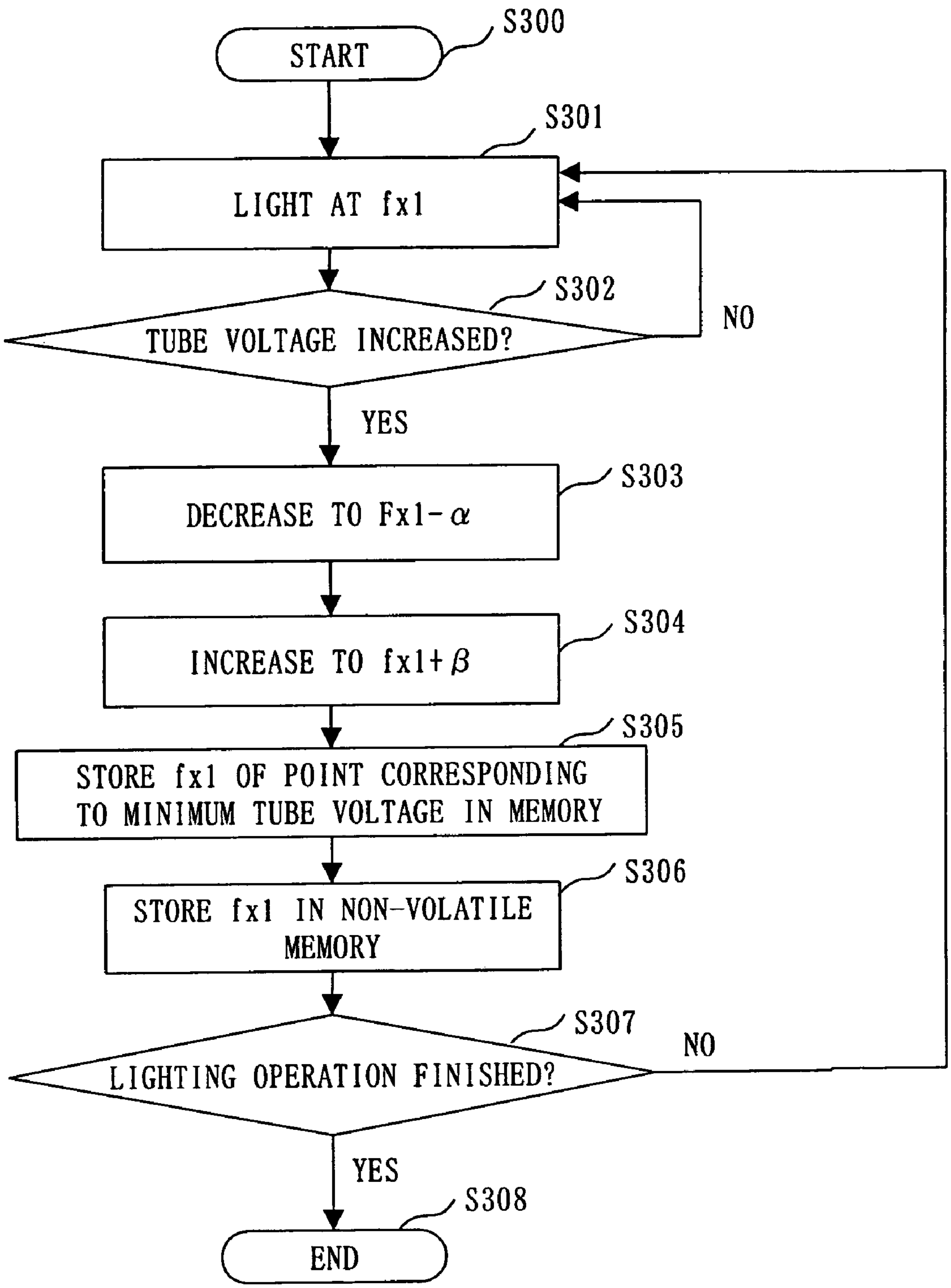
FIG. 7 is a flow chart showing a flow of an operation of the high pressure discharge lamp lighting apparatus of the third embodiment.

FIG. 7 is a flowchart showing an operation flow of the high pressure discharge lamp lighting apparatus according to the third embodiment. The circuit configuration of the high pressure discharge lamp lighting apparatus is the same as one of the first embodiment.

In the following, a lighting operation of the high pressure discharge lamp lighting apparatus having this configuration will be explained by referring to the flowchart of FIG. 7. In case of starting operation of the lighting apparatus (step S300), the control circuit 10 lights the high pressure discharge lamp 8 by previously setting the high pressure discharge lamp 8 to an arbitrary frequency fx1 which matches the resonance-free frequency (step S301). Then, the control circuit 10 checks if the lamp voltage of the high pressure discharge lamp 8 has increased or not using the lamp voltage detecting circuit 9 and checks if the lighting frequency has approached the acoustic resonant frequency band that is off the resonance-free region (step S302). Here, in case of NO at step S302, the control circuit 10 continues to light the high pressure discharge lamp 8 at the lighting frequency fx1 (step S301).

Next, in case of YES at step S302, the control circuit 10 changes the lighting frequency of the high pressure discharge lamp 8 by decreasing it to the frequency that is equal to fx1−α (step S303). Then, the control circuit 10 increases the lighting frequency to the frequency that is equal to fx1+β (step S304). Subsequently, in the process of changing the decrease of the lighting frequency to the increase, the control circuit 10 stores the frequency of a point corresponding to the minimum lamp voltage as a new value of fx1, and performs the lighting operation at this frequency fx1 (step S305). Next, the control circuit 10 sets the lighting frequency fx1 in the non-volatile memory (step S306). The subsequent operations (steps S307 through 308) are the same as ones in the first embodiment and the explanation is omitted here.

Figure 8:
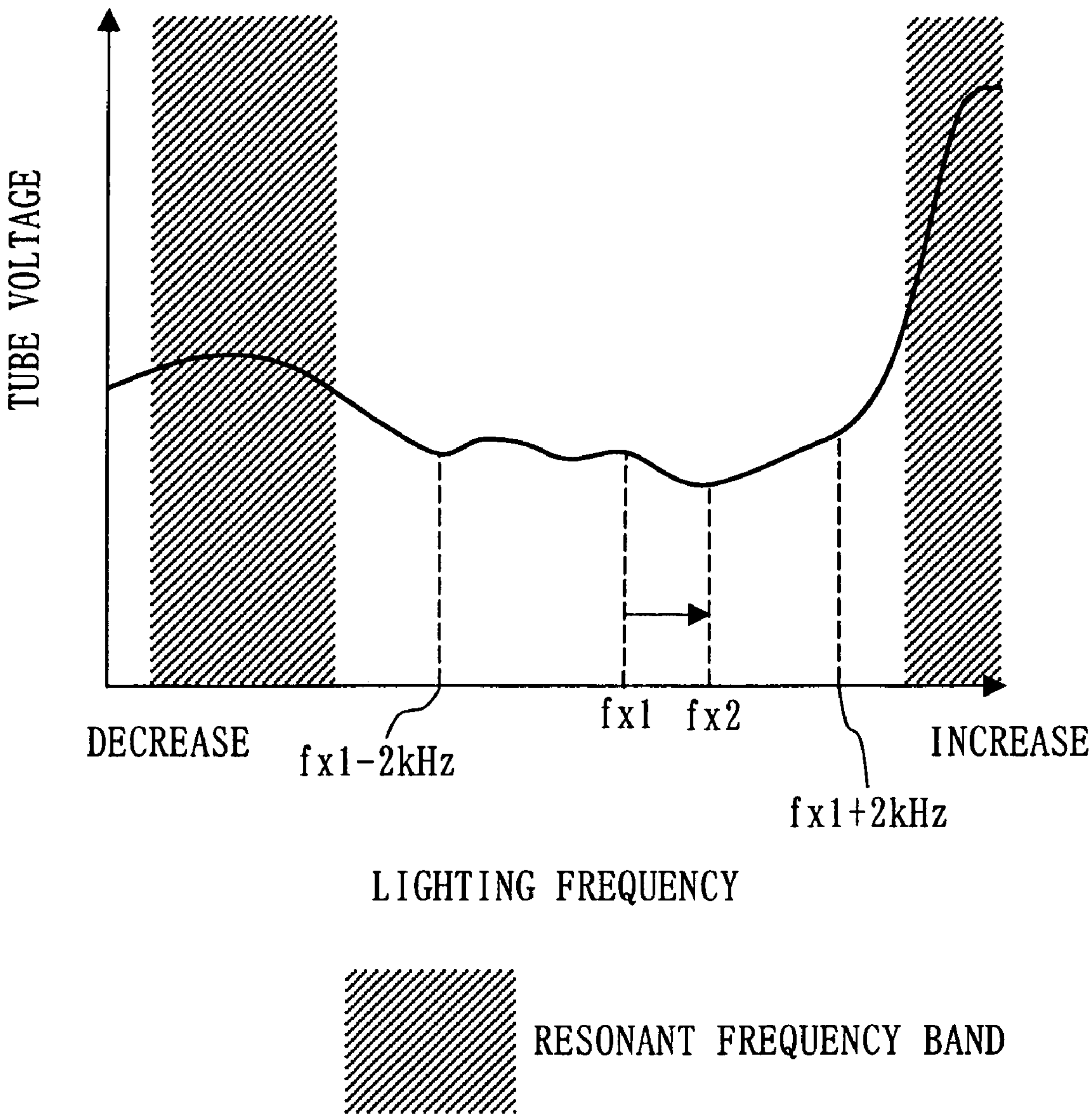
FIG. 8 is a timing chart showing a timing of the operation of the high pressure discharge lamp lighting apparatus of the third embodiment.

Further, the operation will be explained by referring to FIG. 8, which is a timing chart showing characteristics of the lamp voltage in respect of the decrease/increase of the lighting frequency. FIG. 8 shows an example of the characteristics of the high pressure discharge lamp 8, of which the lamp voltage of the resonance-free frequency band has a form with multiple convexes and concaves. In FIG. 8, the control circuit 10 performs the lighting operation by setting the lighting frequency to fx1 at starting, and after decreasing the lighting frequency to, for example, fx1−2 kHz, the control circuit 10 increases to fx1+2 kHz. The control circuit 10 stores the lighting frequency fx2 that is the frequency of the point at which the lamp voltage becomes the minimum during the process, and the lighting operation is continued at the frequency fx2. Next, in case of detecting the increase of the lamp voltage by the lamp voltage detecting circuit 9, the control circuit 10 decreases the frequency from fx2 to fx2−skHz, and then increases to fx2+2 kHz. This series of changing the frequency is repeated sequentially. Directly before terminating the lighting operation of the lighting apparatus, the control circuit 10 stores the above frequency fx2, in the non-volatile memory, and the control circuit 10 sets the lighting frequency to fx2 at starting the next lighting operation and performs the lighting operation.

As has been discussed, when the lamp voltage of the high pressure discharge lamp 8 increases, the lighting frequency is changed within the predetermined frequency range, the lighting frequency of a point when the lamp voltage is the lowest is extracted, and the high pressure discharge lamp 8 is lit at this lighting frequency. Accordingly, even if the resonance-free frequency band is moved due to the aging of the high pressure discharge lamp 8, etc., it is possible to constantly light the high pressure discharge lamp 8 in a steady state.

In this way, according to the high pressure discharge lamp lighting apparatus and the high pressure discharge lamp lighting method of the present embodiment, in addition to the features of the high pressure discharge lamp lighting apparatuses of the first and the second embodiments, after lighting the high pressure discharge lamp at a predetermined frequency, the control circuit 10 decreases the frequency of the high frequency power, increases the high frequency power, and moves the frequency of the high frequency power to the lighting frequency that is determined based on the above frequencies. The range of this series of changing frequencies is limited, which always prevents the generation of the acoustic resonance phenomena and enables to light the high pressure discharge lamp in a steady state.

Embodiment 4.

The high pressure discharge lamp usually has characteristics that after the discharge due to the encapsulated argon gas for about 30 seconds from the start of lighting, then metal component such as mercury begins to evaporate, and the lamp voltage suddenly increases.

In this embodiment, a control method will be explained, for a case in which the lighting frequency is set at the starting time so that after the discharge due to the argon gas continues, the lighting frequency reaches a region in which acoustic resonance phenomena occurs.

Figure 9:
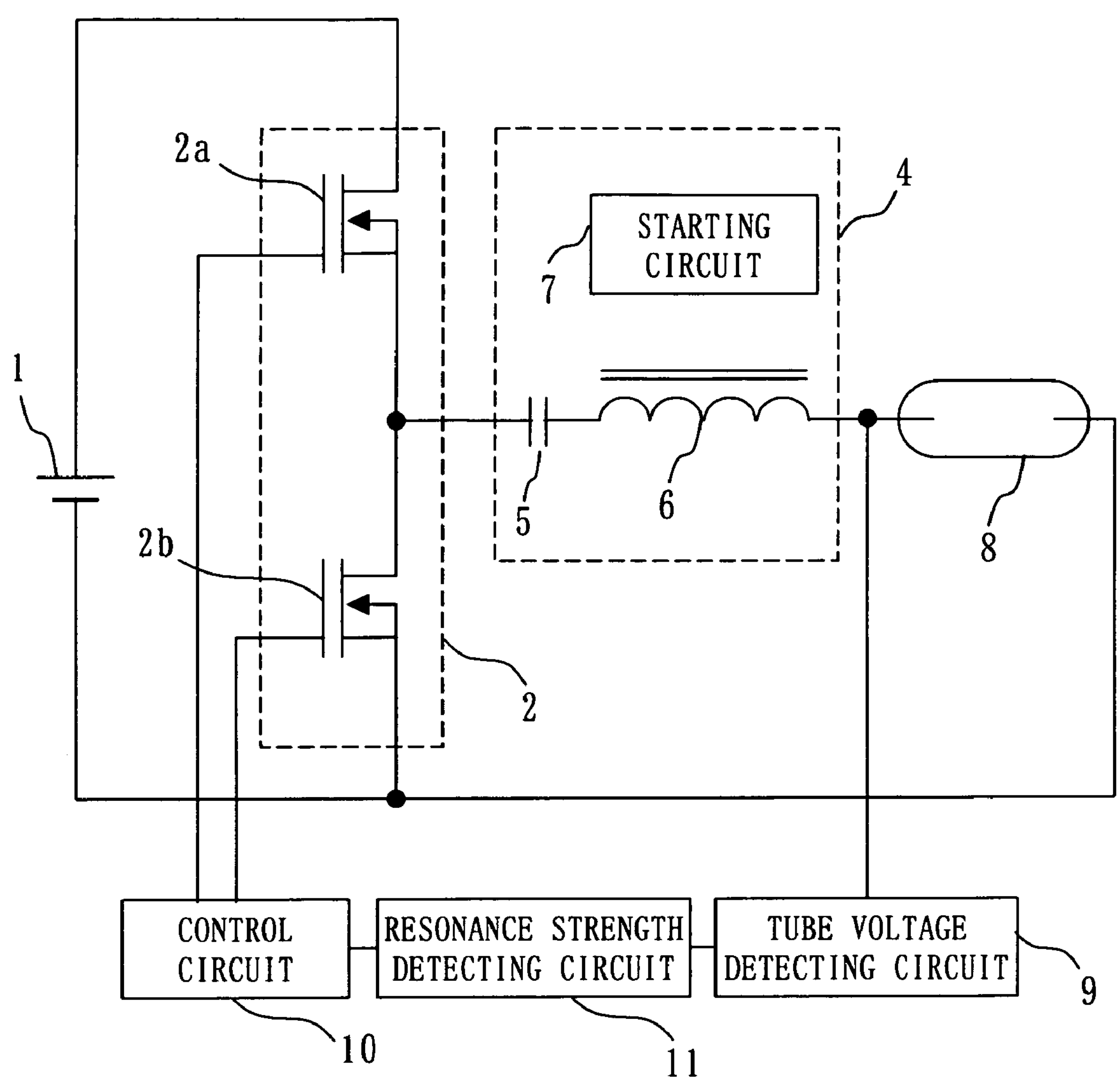
FIG. 9 shows a circuit configuration of a high pressure discharge lamp lighting apparatus according to the fourth embodiment of the present invention.

FIG. 9 shows a circuit configuration of the high pressure discharge lamp lighting apparatus according to the present embodiment. Different from the circuit configuration of the high pressure discharge lamp lighting apparatus shown in FIG. 1, a resonance strength detecting circuit 11 is newly added to the circuit configuration of FIG. 9.

Figure 10:
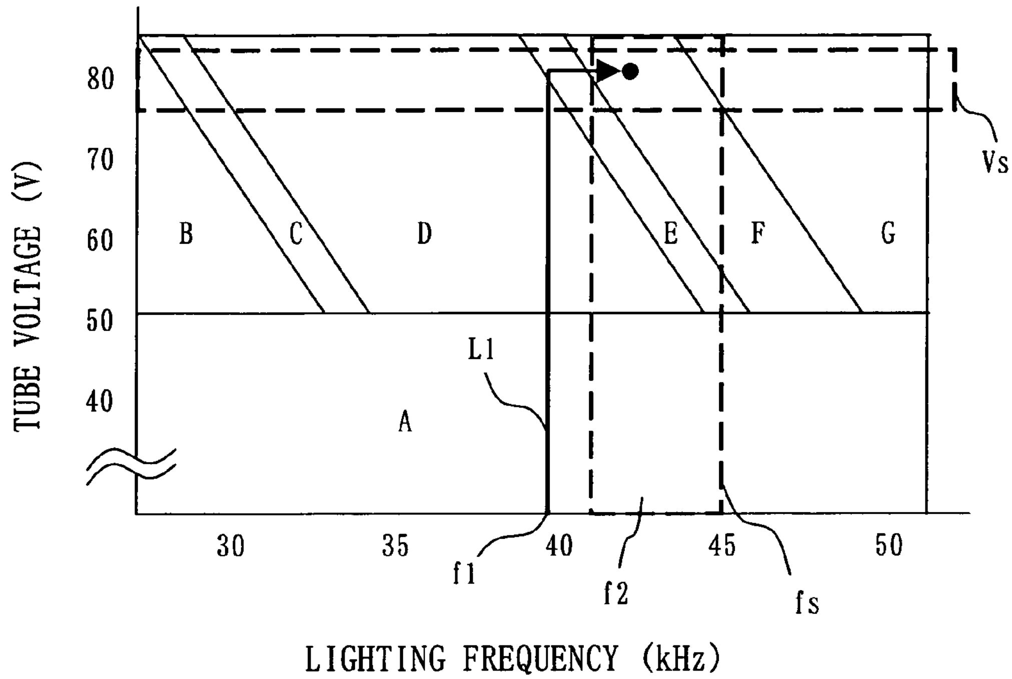
FIG. 10 shows a trace L1 of an operation point of the high pressure discharge lamp lighting apparatus according to the fourth embodiment.

Further, FIG. 10 concretely shows relationship among the lighting frequency and the lamp voltage of a metal halide high pressure discharge lamp having a ceramic arc tube of rated dissipation 35 W and the acoustic resonance phenomena cause by this. As shown in the figure, the relationship can be divided to areas of A, B, C, D, E, F, and G according to the occurrence or the strength of the acoustic resonance phenomena.

Here, the region in which the acoustic resonance phenomena occurs and the region in which the acoustic resonance phenomena does not occur are referred to as "resonant region" and "resonance-free region," respectively. The resonant region is divided into three: high, intermediate, and low according to the strength of the resonance.

First, in the "high resonant region," the discharge arc violently wavers and dies out. And in the "intermediate resonant region," there are few possibilities of dying out of the discharge arc, though the discharge arc wavers. It can be presumed the lighting itself cannot occur in these two resonant regions.

Further, in the "low resonant range," although the acoustic resonance phenomena rarely occur, the discharge arc is not completely stable and it sometimes flickers. Accordingly, there creates no problem in case of using the "low resonant region" when luminous flux rises; however, it is inappropriate to use the "low resonant region" as a region for steady state lighting of the lamp, since it sometimes gives the user a sense of discomfort.

Under this criteria, the region A is an area which is occupied by the discharge of argon gas having the lamp voltage of 0V through approximately 50V and the region A is also "resonance-free range." All the regions B, C, D, E, F, and G are areas in which the lamp voltage is equal to or greater than approximately 50V, and they are aligned sequentially in this order from the range having the lowest lighting frequency. They correspond to "high resonant region," "resonance-free region," "low resonant region," "intermediate resonant region," "resonance-free region," "high resonant region," respectively.

Further, these regions B through G have features that the frequency tends to decrease at a boundary between the adjacent regions according to the increase of the lamp voltage.

In case of FIG. 10, the boundaries between the regions B and C, the regions C and D, the regions D and E, the regions E and F, and the regions F and G are approximated by straight lines having a slope of (−0.17 KHz/V) from basic points of (31 KHz, 50V), (32.5 KHz, 50V), (44.5 KHz, 50V), (46 KHz, 50V), (49.5 KHz, 50V), respectively.

The above relationship between the voltage and the frequency is not strictly defined, but the relationship vary more or less based on a variety or secular changes of the lamps.

The following can be considered as for a reason why the frequency at the boundary decreases as the lamp voltage increases can be considered.

Generally, when the frequency, by which the acoustic resonance phenomena occurs, is assumed to be fr, it is known that the frequency fr is in proportion with a product of the speed of sound within the arc tube and a formal factor of the arc tube.

On the other hand, when average molecular weight of gas enclosed in the tube and the absolute temperature are assumed M and T, respectively, it is known that the speed of sound is in proportion with (absolute temperature T)/(average molecular weight M) to the $\frac{1}{2}^{th}$ power.

Here, the changing rate of the absolute temperature T at rising time and the changing rate of the average molecular weight M are compared, the average molecular weight M suddenly increases after the discharge due to the argon gas, since the encapsulated metal component such as mercury, sodium, thallium, scandium, and dysprosium evaporates, and the changing rate of the average molecular weight M much exceeds the absolute temperature T. This means (absolute temperature T)/(average molecular weight M) decreases after the discharge due to the argon gas, and the frequency fr also decreases. As a result, the boundary shows characteristics that the frequency decreases accompanied to the increase of the lamp voltage as shown in FIG. 10.

Further, the lamp voltage increases from the starting time and continues to increase if the lamp voltage avoids passing through the intermediate or high resonant region, and reaches the saturation voltage at which the voltage cannot increase any more. In FIG. 10, Vs represents a voltage range (75 through 82V) in which the saturation voltages concentrate. A frequency range (41 through 45 KHz) of a part, from which the region F (resonance-free region) is cut by the voltage range Vs, is represented by fs.

In order to light the high pressure discharge lamp in a steady state without flickering, it is important to control to gather the lamp voltage and the lighting frequency within the region surrounded by the voltage range Vs and the frequency range fs. L1 shows a track of an operation point given by the lamp voltage and the lighting frequency of the high pressure discharge lamp lighting apparatus according to the present embodiment.

In the figure, Vs is set to 75 through 82V; however, Vs may vary according to a variety or secular change.

Next, the operation will be explained referring to FIGS. 9 and 10.

The lighting frequency f1 at the starting time is set arbitrarily around the frequency range fs. For the explanation in the present embodiment, the frequency is set in case that the lamp voltage moves from the region A (resonance-free region) to the region E (intermediate resonant region) through the region D (low resonant region).

First, the control circuit 10 controls the operation of each of switching elements 2_a_ and 2_b_ with the frequency f1 at the starting time and keeps this frequency f1 until a switching signal is received from the resonance strength detecting circuit 11.

The lamp voltage detecting circuit 9 detects an actual value or a peak value of the lamp voltage by rectifying, and the lamp voltage detecting circuit 9 inputs the detected value to the resonance strength detecting circuit 11. When flickering occurs due to the instabilities of the discharge arc of the high pressure discharge lamp, the rectified lamp voltage vibrates synchronously to this.

In case of the present embodiment, the flickering begins during the period (around the boundary between the region D and the region E) when the status moves to the region E (intermediate resonant region) from the region D (low resonant region) as the lamp voltage increases.

On the other hand, the resonance strength detecting circuit 11 calculates amplitude of the voltage change of the lamp voltage, the current of which is made to be direct, and when the calculated amplitude becomes equal to or greater than a predetermined value, it is judged the waver of the discharge lamp due to the acoustic resonance phenomena has the predetermined value. The resonance strength detecting circuit 11 is set so as to output the switching signal and increase the frequency f1 output from the control circuit 10 by the predetermined width of δ f1.

Accordingly, the boundary area is detected by this between the region D (low resonant region) and the region E (intermediate resonant region), and the control circuit 10 switches the lighting frequency from the frequency f1 to a new frequency f2 (=f1+δ f1 ), which is contained in the region F (resonance-free region) and outputs. Here, the predetermined width δ f1 is set to be higher than the frequency width of the region E (intermediate resonant region) based on the region separation obtained experimentally.

The operation point given by the lamp voltage and the lighting frequency moves as the region A (resonance-free region)→the region D (low resonant region)→the region F (resonance-free region); that is, the operation point can reach the region for steady state lighting, avoiding to pass through the intermediate or the high resonant region.

Further, around the boundary between the region D (low resonant region) and the region E (intermediate resonant region), the moment when the vibration of the lamp voltage is detected or the moment when the operation point passes the region E (intermediate resonant region) is sufficiently short from both viewpoints of discharge phenomena and visual observation, so that the flickering does not become a problem. Although there are various methods to control to gather the lighting frequencies within the resonance-free region after switching the lighting frequency from f1 to f2, the explanation will be omitted, since the methods do not relate to the main theme of the present invention.

As discussed above, the lighting frequency is changed according to the change of the discharging status at the starting time of the luminous flux to avoid the acoustic resonance phenomena, so that the occurrence of flickering before reaching the point for steady state lighting can be avoided.

When the boundary area between the region D (low resonant region) and the region E (intermediate resonant region) is not detected by the resonance strength detecting circuit 11 even if the predetermined time has passed from the starting time of the lighting operation, the control circuit 10 can forcibly switch the lighting frequency from f1 to f2.

In this way, the lighting frequency f1 can be set low at the starting time. And therefore, in the region D (low resonant region) in which the acoustic resonance phenomena is hard to occur, the control can be surely moved to the control in the resonance-free region for steady state lighting even if the instabilities of the discharge arc is too small to be detected, so that the steady state of the lighting can be secured.

Further, in the present embodiment, a case has been discussed, in which the lamp voltage has reached the voltage range Vs when the lamp voltage reaches the boundary area between the region D (low resonant region) and the region E (intermediate resonant region) and the control can be simply switching the lighting frequency from f1 to f2. In the upcoming embodiment, another case will be explained, in which when the lamp voltage reaches the boundary area between the region D and the region E, the control has not reached the voltage range Vs.

As has been discussed, the high pressure discharge lamp lighting apparatus and the high pressure discharge lamp lighting method include the resonance strength detecting means for detecting the rate of the instabilities of the discharge arc due to the acoustic resonance phenomena based on the change of the lamp voltage by the lamp voltage detecting means. After starting the operation under the condition that the lighting frequency is set by the first frequency which is lower than the maximum frequency of a certain frequency range for steady state lighting the high pressure discharge lamp within the resonance-free region, when the instabilities of the discharge arc, which exceeds a predetermined extent, is detected by the resonance strength detecting means, the control circuit increases the lighting frequency from the first frequency by a certain amount and switches to the second frequency, which belongs to the resonance-free region. Accordingly, it becomes possible to surely avoid the flickering due to the acoustic resonance phenomena.

When the resonance strength detecting means does not detect the instabilities of the discharge arc that exceeds the predetermined rate even if the predetermined time has passed since the lighting operation started, the control circuit switches the lighting frequency from the first frequency to the second frequency forcibly. Accordingly, it is possible to avoid misdetection due to a transitional change of the lamp voltage that occurs directly after the lighting operation starts, which enables to certainly avoid the acoustic resonance phenomena. Further, even if no acoustic resonance phenomena occurs at rising time of the luminous flux, it is possible to move to the control for steady state lighting, which enables to secure the steadiness of the lighting.

Further, after the lighting operation starts under the condition of setting the first lighting frequency, which is lower than the maximum frequency within a particular frequency range, as the lighting frequency, either when the lamp voltage exceeds the predetermined value or when the predetermined time has passed since the lighting operation starts, the control circuit increases the lighting frequency from the first frequency by the predetermined amount and switch the lighting frequency to the second frequency, which belongs to the resonance-free region. Accordingly, it is possible to avoid misdetection due to a transitional change of the lamp voltage that occurs directly after the lighting operation starts, which enables to certainly avoid the acoustic resonance phenomena and to move to the control for steady state lighting.

Embodiment 5.

In the fourth embodiment, the control method has been explained, in which the frequency, which moves from the region A (resonance-free region) to the region D (low resonant region) accompanied to the increase of the lamp voltage, is selected at the starting time. In the present embodiment, another case will be explained, in which another frequency that moves from the region A (resonance-free region) to the region G (high resonant region) through the region F (resonance-free region) is selected.

The circuit configuration is the same as one shown in the fourth embodiment and explanation will be omitted here.

Figure 11:
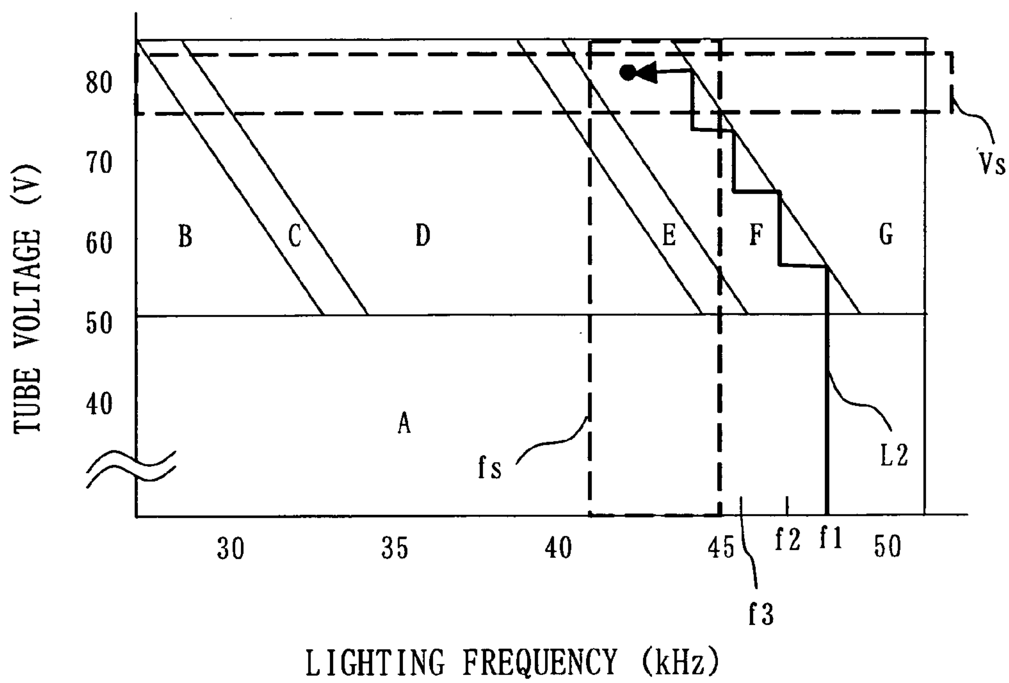
FIG. 11 shows a trace L2 of an operation point of the high pressure discharge lamp lighting apparatus according to the fifth embodiment.

In FIG. 11, a locus L2 is added to the segmented regions A through G shown in FIG. 10, which traces the movement of the operation point based on the lamp voltage and the lighting frequency of the high pressure discharge lamp lighting apparatus.

Next, an operation will be explained referring to FIGS. 9 and 11.

That the control circuit 10 controls the operation of each switching element at the frequency f1 at the starting time and maintains this frequency until the control circuit 10 receives the switching signal output from the resonance strength detecting circuit 11, that the lamp voltage rectified by the lamp voltage detecting circuit 9 vibrates synchronously to the instabilities of the arc of the high pressure discharge lamp, and that the rectified lamp voltage is input to the resonance strength detecting circuit 11 are the same as the fourth embodiment.

As described above, the lighting frequency f1 is set to the frequency that moves from the region A (resonance-free region) to the region G (high resonant region) through the region F (resonance-free region) according to the rising of the luminous flux (increase of the lamp voltage). The flickering starts from the point when the lamp voltage reaches around the boundary between the region F (resonance-free region) and the region G (high resonant region).

On the other hand, the resonance strength detecting circuit 11 calculates amplitude of the voltage variation of the rectified lamp voltage, outputs the switching signal when the amplitude exceeds the predetermined value, and decreases the frequency f1, which controls the operation of the switching element, by the predetermined width δ f2.

Consequently, the boundary area between the region F (resonance-free region) and the region G (high resonant region) is detected by this, and the control circuit 10 controls the operation of each switching element at a new lighting frequency f2 (=f1−δ f2 ), which is included in the region F (resonance-free region). The control circuit 10 maintains the frequency f2 until the control circuit 10 receives the switching signal again. Here, the predetermined width δ f2 is set lower than the frequency width of the region F (resonance-free region).

In this case, as clearly shown in the figure, since the lamp voltage has not reached the voltage range Vs for steady state lighting, the lamp voltage continues to increase, and the boundary area between the region F (resonance-free region) and the region G (high resonant region) is detected again. After this detection, when the switching signal is output from the resonance strength detecting circuit 11, the control circuit 10 decreases the lighting frequency by δ f2 and control the operation of each switching element with the frequency f3 (=f2−δ f2 ) included in the region F (resonance-free region). This operation will be repeated until the lamp voltage reaches the voltage range Vs and gets saturated, and the lighting frequency is switched gradually so as to constantly stay in the region F (non-resonance region).

In this way, the operation point given by the lamp voltage and the lighting frequency can move as follows: the region A (resonance-free region)→the region F (resonance-free region), avoiding to pass through the resonant region, and reach the region for steady state lighting.

Although there are various methods of a control for keeping the lighting frequency within the resonance-free region after reaching the point for steady state lighting, such a method does not relate to the main purpose of the present invention, and an explanation will be omitted here. However, by performing the above operation repeatedly makes the lighting frequency stay within the resonance-free region. Accordingly, the above operation can be used for keeping the lighting frequency within the resonance-free region.

As has been discussed, the lighting frequency is made to vary at the rising time of luminous flux according to the change of the discharging status to avoid the acoustic resonance phenomena, so that the flickering during lighting process of the lamp including status before reaching the point for steady state lighting. Further, there is no need to switch the frequency for passing through the resonant region before reaching the point for steady state lighting, and it is possible to reach the point for steady state lighting, which enables to rise the luminous flux more steadily.

In this way, according to the high pressure discharge lamp lighting apparatus and the high pressure discharge lamp lighting method, after the operation is started with setting the first frequency, which is higher than the maximum frequency within a particular frequency range for steady state lighting the high pressure discharge lamp within the resonance-free region, as the lighting frequency, when the resonance strength detecting means detects the instabilities of the discharge arc which exceeds the predetermined value, the control circuit 10 decreases the lighting frequency by the predetermined rate from the first frequency and switches to the second frequency which belongs to the resonance-free region. At the same time, within the resonance-free region, the control circuit 10 decreases the second frequency gradually or continuously according to the increase of the lamp voltage. Accordingly, there is no need to dynamically switch the frequency from starting the lighting operation up to reaching the steady state lighting, which enables to obtain the rising feature of the luminous flux without visually uncomfortable feeling.

Further, after the operation is started with setting the first frequency, which is higher than the maximum frequency within a particular frequency range for steady state lighting the high pressure discharge lamp within the resonance-free region, as the lighting frequency, when the lamp voltage exceeds the predetermined value or the predetermined time has passed since starting the lighting operation, the control circuit 10 decreases the lighting frequency by the predetermined amount from the first frequency and switches to the second frequency, which belongs to the resonance-free region. At the same time, within the resonance-free region, the control circuit 10 decreases the second frequency gradually or continuously according to the increase of the lamp voltage, so that misdetection due to the initial transitional change of the lamp voltage directly after starting the lighting operation can be prevented. And therefore, the acoustic resonance phenomena can be certainly avoided. Further, there is no need to dynamically switch the frequency from starting the lighting operation up to reaching the steady state lighting, which enables to obtain the rising feature of the luminous flux without visually uncomfortable feeling.

Further, the operation of gradually decreasing the second frequency is performed by the control circuit with repeatedly decreasing the lighting frequency by the predetermined amount when the resonance strength detecting means detects the instabilities of the discharge arc which exceeds the predetermined rate accompanied to the increase of the lighting frequency, which surely enables to decrease the second frequency gradually. Further, there is no need to drastically switch the frequency from starting the lighting operation up to reaching the steady state lighting, which enables to obtain the rising feature of the luminous flux without visually uncomfortable feeling.

Embodiment 6.

In the fifth embodiment, the frequency control has been explained when the frequency is set to move from the region A (resonance-free region) to the region G (high resonant region) through the region F (resonance-free region) accompanied to the increase of the lamp voltage. In the present embodiment, another control method will be explained, in which the operation point given by the lamp voltage and the lighting frequency follows another locus in the same case with the fifth embodiment.

The circuit configuration is the same as one shown in the fourth embodiment and explanation will be omitted here.

Figure 12:
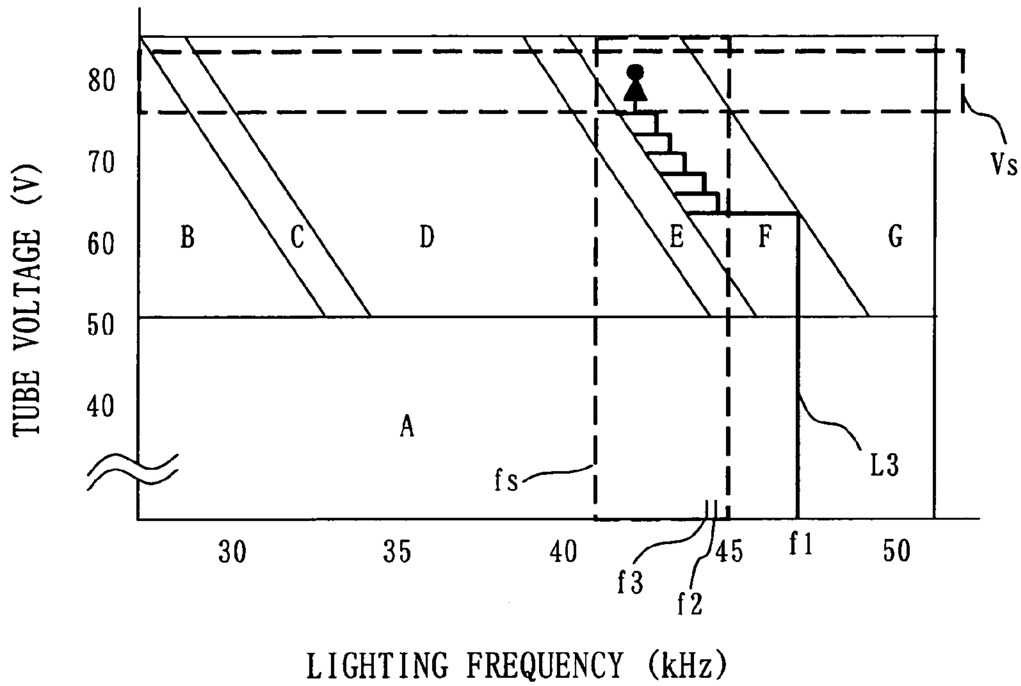
FIG. 12 shows a trace L3 of an operation point of the high pressure discharge lamp lighting apparatus according to the sixth embodiment.

In FIG. 12, a locus L3 is added to the segmented regions A through G shown in FIG. 10, which traces the movement of the operation point based on the lamp voltage and the lighting frequency of the high pressure discharge lamp lighting apparatus.

Next, the operation will be described referring to FIGS. 9 and 12.

That the control circuit 10 controls the operation of each switching element at the frequency f1 at the starting time and maintains this frequency until the control circuit 10 receives the switching signal output from the resonance strength detecting circuit 11, that the lamp voltage rectified by the lamp voltage detecting circuit 9 vibrates synchronously to the instabilities of the arc of the high pressure discharge lamp, and that the rectified lamp voltage is input to the resonance strength detecting circuit 11 are the same as the fourth embodiment.

On the other hand, the resonance strength detecting circuit 11 calculates an amplitude width of the voltage change of the rectified lamp voltage, and outputs the switching signal when the amplitude exceeds the predetermined value, and the control circuit 10 gradually diminishes the frequency f1 for controlling the operation of each switching element. As the control circuit 10 gradually diminishes the frequency, the flickering occurs around the boundary area between the region F (resonance-free region) and the region E (intermediate resonant region) again before long.

Due to this occurrence of the flickering, the boundary area between the region F (resonance-free region) and the region E (intermediate resonant region) is detected, and the control circuit 10 controls the operation of each switching element with a new lighting frequency f2 (=f1−fh+δ f3 ) contained in the region F (resonance-free region). Here, fh means a frequency width of the region F (resonance-free region), and δ f3 means a frequency increment, which is set lower than the frequency width fh. Both are set based on region segmentation obtained experimentally.

In this case, the lamp voltage also continues to increase as clearly shown in the figure, since the lamp voltage has not reached the voltage range Vs for steady state lighting.

Here, the lighting frequency f2 is kept for a predetermined period, and during which the lamp voltage increases. After keeping for the predetermined period, using the switching signal output from the resonance strength detecting circuit 11 as a trigger, the frequency is started gradually diminishing again. As the frequency is being diminished, the frequency of the boundary area between the region F (resonance-free region) and the region E (intermediate resonance region) can be obtained again. The control circuit 10 increases the obtained frequency by δ f3 and controls the operation of each switching element with the lighting frequency f3 included in the region F (non-resonance region).

This operation is repeated until the lamp voltage reaches the voltage range Vs and gets saturated, and the lighting frequency is switched gradually so that the lighting frequency fn always stay in the region F (non-resonance region).

By this operation, the operation point, which is given by the lamp voltage and the lighting frequency, can moves to reach the range for the steady state lighting as follows: the region A (resonance-free region)→the region F (resonance-free region), without passing through the resonant region.

Although there are various methods of a control for keeping the lighting frequency within the resonance-free region after reaching the point for steady state lighting, such a method does not relate to the main purpose of the present invention, and an explanation will be omitted here. However, by performing the above operation repeatedly makes the lighting frequency stay within the resonance-free region. Accordingly, the above operation can be used for keeping the lighting frequency within the resonance-free region.

As has been discussed, the lighting frequency is made to vary at the starting time of luminous flux accompanied to the change of the discharging status to avoid the acoustic resonance phenomena, so that the flickering during lighting process of the lamp including a period before reaching the point for steady state lighting. Further, there is no need to switch the frequency for passing through the resonant region and it is possible to reach the point for steady state lighting, which enables starting the luminous flux in a steadier state. Further, it is possible to perform a similar control by extending an interval of the operation after reaching the point for steady state lighting, which makes the lighting frequency constantly stay in the region F (resonance-free region).

According to the present embodiment, the boundary area is detected between the region E (intermediate resonant region) and the region F (resonance-free region) by decreasing the lighting frequency for deciding the lighting frequency fn (n>2); however, the same effect can be obtained by detecting the boundary area between the region F (resonance-free region) and the region G (high resonant region) by increasing the lighting frequency on the contrary and setting the lighting frequency as one that is lower than the boundary by δ f4.

As discussed, according to the high pressure discharge lamp lighting apparatus and the high pressure discharge lamp lighting method, the operation of gradually decreasing the second frequency is performed by the control circuit with repeatedly decreasing the lighting frequency by the predetermined amount when the resonance strength detecting means detects the instabilities of the discharge arc which exceeds the predetermined rate accompanied to the increase of the lighting frequency, which surely enables to decrease the second frequency gradually. Further, there is no need to drastically switch the frequency from starting the lighting operation up to reaching the steady state lighting, which enables to obtain the rising feature of the luminous flux without visually uncomfortable feeling.

Embodiment 7.

In the fifth or the sixth embodiment, the control method has been explained, in which the boundary area between the region F (resonance-free region) and the region E (intermediate resonant region) or the region G (high resonant region) is detected, the frequency corresponding to the boundary area is displaced a little, and the lighting frequency is made to constantly stay within the region F (resonance-free region). In the present embodiment, another control method will be explained, in which the lighting frequency can be constantly stay within the region F (resonance-free region) without detecting the boundary area.

The circuit configuration is the same as one shown in the fourth embodiment, and an explanation will be omitted here.

Figure 13:
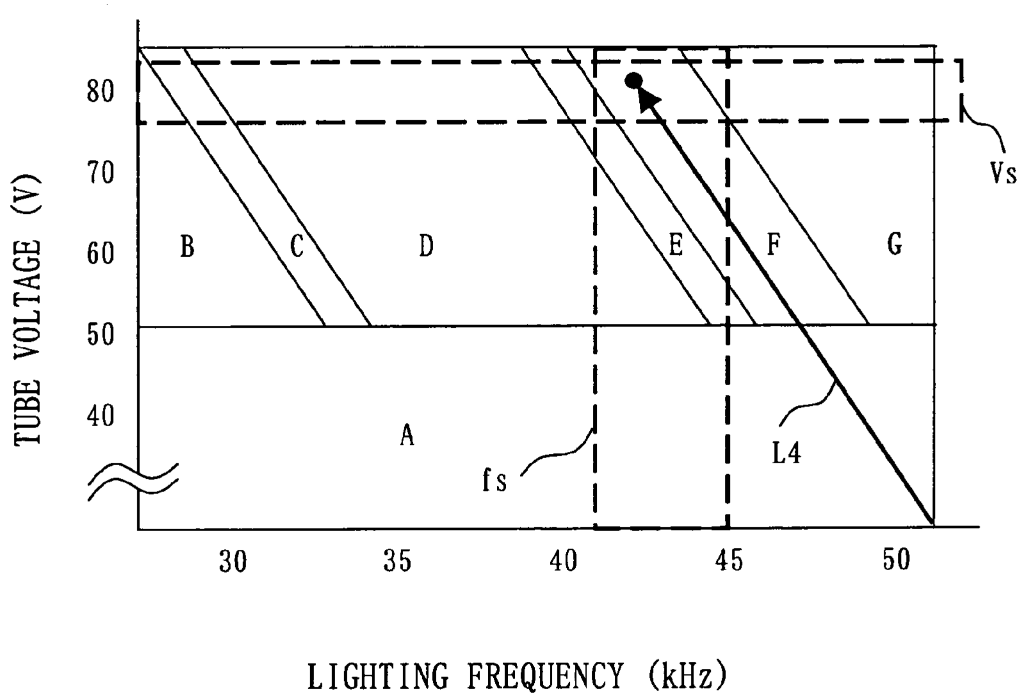
FIG. 13 shows a trace L4 of an operation point of the high pressure discharge lamp lighting apparatus according to the seventh embodiment.

In FIG. 13, a locus L4 is added to the segmented regions A through G shown in FIG. 10, which traces the movement of the operation point based on the lamp voltage and the lighting frequency of the high pressure discharge lamp lighting apparatus.

Next, the operation will be described referring to FIGS. 9 and 13.

In the control circuit 10, a conversion equation is previously obtained for a locus which follows the operation point given by the lamp voltage and the lighting frequency within the region F (resonance-free region) so that the lighting frequency decreases by an approximately fixed changing rate in respect of the increase of the lamp voltage, and the conversion equation is stored in a memory in the control circuit 10 (which is not shown in the figure).

Then, the lamp voltage detecting circuit 9 confirms that the lamp voltage stays within the region F (resonance-free region), the frequency is calculated by the conversion equation stored in the memory based on the lamp voltage, and the lighting frequency is controlled to become the calculated frequency.

By the above operation, the operation point given by the lamp voltage and the lighting frequency reaches the control F (resonance-free region), and then the operation point gradually diminishes accompanied to the increase of the lamp voltage, while constantly staying in the region F (resonance-free region).

Namely, the operation point moves as follows: the region A (resonance-free region)→the region F (resonance-free region), and can move to the steady state lighting, avoiding to pass through the resonant region.

In the above, a case employing the conversion equation has been explained; in another way, a conversion table is previously created and can be stored in the memory. Although there are various methods of a control for keeping the lighting frequency within the resonance-free region after reaching the point for steady state lighting, such a method does not relate to the main purpose of the present invention, and an explanation will be omitted here. However, by performing the above operation repeatedly makes the lighting frequency stay within the resonance-free region. Accordingly, the above operation can be used for keeping the lighting frequency within the resonance-free region.

As has been discussed, since the lighting frequency is decreased according to the lamp voltage and the acoustic resonance phenomena can be avoided, which enables to avoid the flickering, including a period before the steady state lighting.

In this way, according to the high pressure discharge lamp lighting apparatus and the high pressure discharge lamp lighting method, the operation of gradually decreasing the second frequency is performed by the control circuit with repeatedly decreasing the lighting frequency by the predetermined amount when the resonance strength detecting means detects the instabilities of the discharge arc which exceeds the predetermined rate accompanied to the increase of the lighting frequency, which surely enables to decrease the second frequency gradually. Further, there is no need to drastically switch the frequency from starting the lighting operation up to reaching the steady state lighting, which enables to obtain the rising feature of the luminous flux without visually uncomfortable feeling.

Further, after the operation starts with setting the first frequency, which is higher than the maximum frequency of a particular frequency range for steady state lighting the high pressure discharge lamp within the resonance-free region, as the lighting frequency, the lighting frequency is then decreased at an approximately fixed rate so as to make the lighting frequency stay within the resonance-free region accompanied to the increase of the lamp voltage, which enables to certainly avoid the acoustic resonance phenomena. Further, there is no need to dynamically switch the frequency from starting the lighting operation up to reaching the steady state lighting, which enables to obtain the rising feature of the luminous flux without visually uncomfortable feeling.

Embodiment 8.

In the fourth through seventh embodiments, a single algorithm is employed to avoid the flickering before the steady state lighting. In the present embodiment, another frequency control will be explained, in which the above operations are combined.

The circuit configuration is the same as shown in the fourth embodiment, and an explanation will be omitted here.

Figure 14:
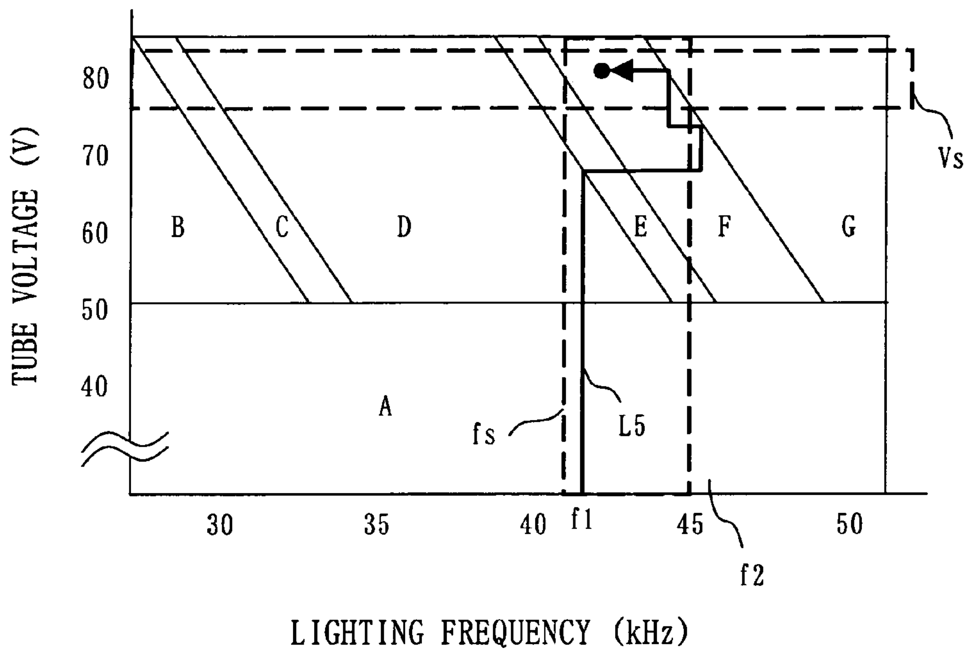
FIG. 14 shows a trace L5 of an operation point of the high pressure discharge lamp lighting apparatus according to the eighth embodiment.
Figure 15:
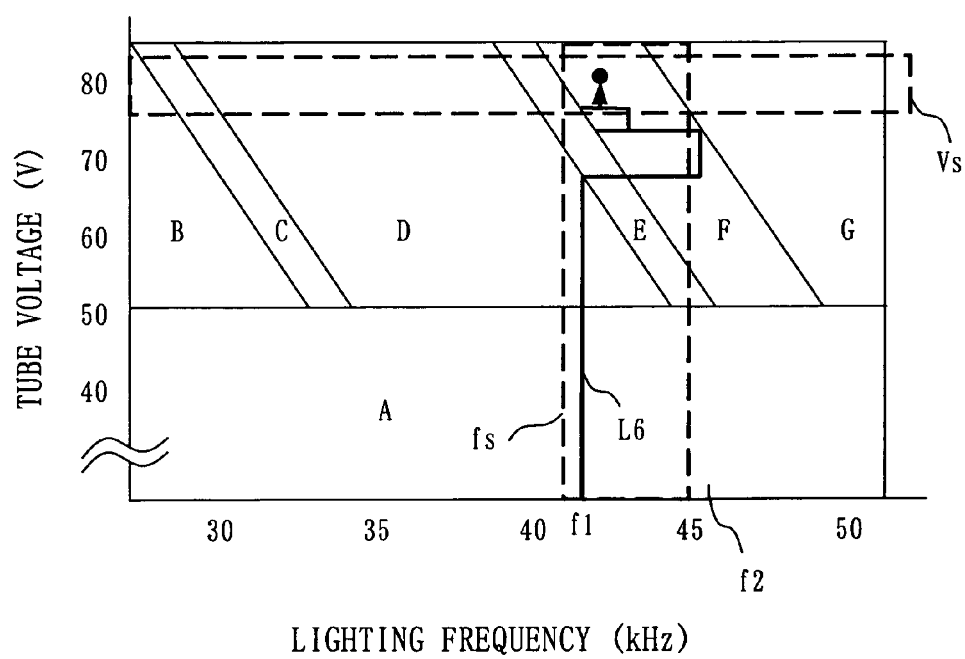
FIG. 15 shows a trace L6 of an operation point of the high pressure discharge lamp lighting apparatus according to the eighth embodiment.
Figure 16:
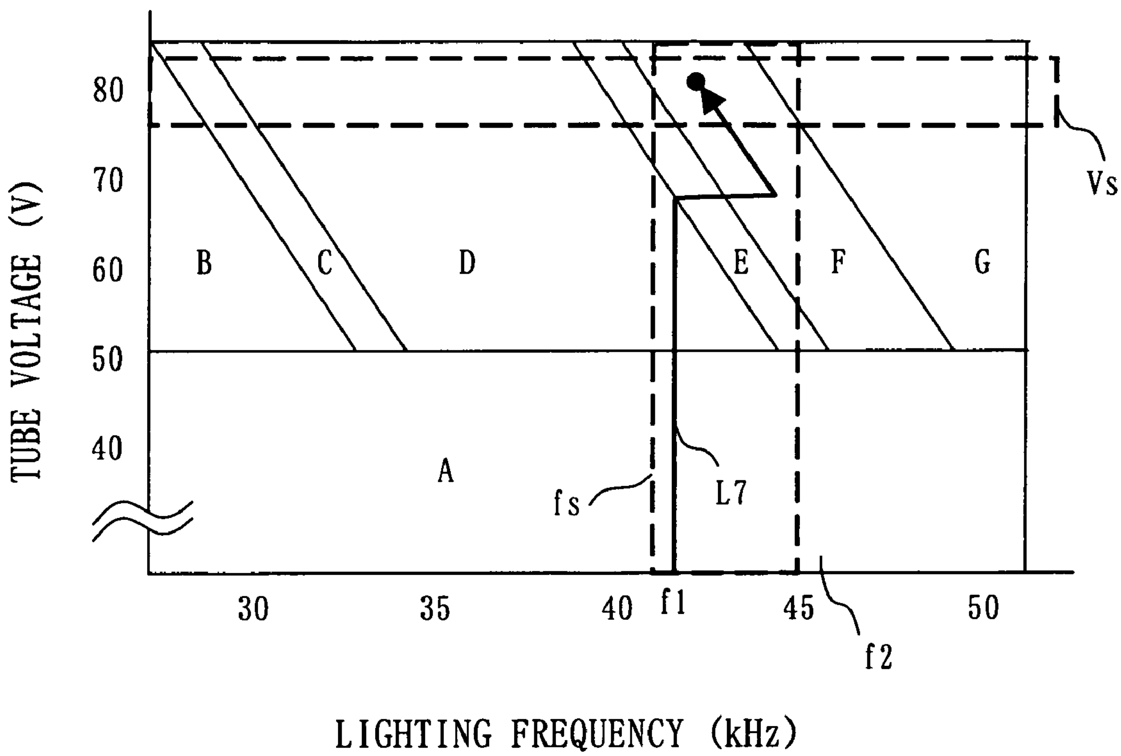
FIG. 16 shows a trace L7 of an operation point of the high pressure discharge lamp lighting apparatus according to the eighth embodiment.
Figure 17:
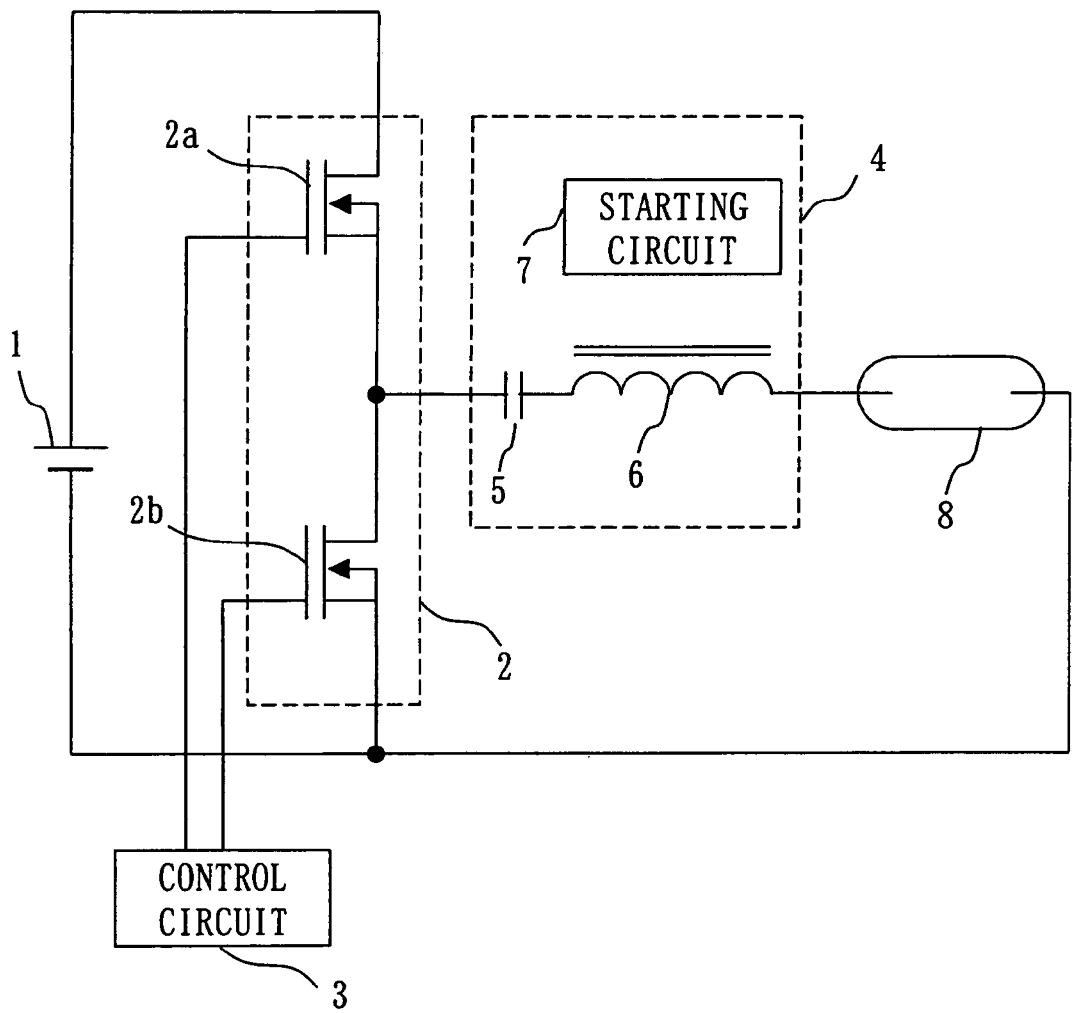
FIG. 17 shows a configuration circuit of a conventional high pressure discharge lamp lighting apparatus.

In FIGS. 14 through 16, loci L5 through L7 are added to the segmented regions A through G shown in FIG. 10, which traces the movement of the operation point based on the lamp voltage and the lighting frequency of the high pressure discharge lamp lighting apparatus.

When the operation point is included in the region A (resonance-free region) and the region D (low resonant region), the loci L5, L6, and L7 are controlled in the same way explained in the fourth embodiment.

When the operation point moves from the region D (low resonant region) to the region F (resonance-free region), the locus L5 is controlled in the same way explained in the fifth embodiment; the locus L6 the six embodiment; and the locus L7 the seventh embodiment.

The operation point given by this with the lamp voltage and the lighting frequency moves as follows: the region A (resonance-free region)→the region D (low resonant region) →the region F (resonance-free region), so that the operation point can move to the steady state lighting with avoiding passing through the intermediate or high resonant region.

A moment when the vibration of the lamp voltage is detected around the boundary area between the region D (low resonant region) and the region E (intermediate resonant region) or a moment when the operation point passes through the region E (intermediate resonant region) is short enough from a viewpoint of discharge phenomena and visual viewpoint, so that the flickering never becomes a problem.

As explained above, the lighting frequency is changed according to the change of the discharge status at rising time of the luminous flux to avoid the acoustic resonance phenomena, which enables to avoid the flickering which may occur before reaching the point for steady state lighting.

Further, by combining plural control algorithms, it is possible to certainly avoid the flickering before reaching the point for steady state lighting regardless of the width of the resonant region E (intermediate resonant region) or the region F (resonance-free region).

In the fourth through eighth embodiments, the metal halide high pressure discharge lamp having the ceramic arc tube of rated dissipation 35W has been explained as an example; however, another high pressure discharge lamp can avoid the flickering before the steady state lighting by the same control as long as its relationship among the frequency, the lamp voltage, and the acoustic resonance phenomena is similar to the above metal halide high pressure discharge lamp.

In the fourth through eighth embodiments, to avoid misdetection, it is possible to ignore the initial transitional status (e.g., the discharge due to argon gas) of the starting time. In such a case, it is appropriate to choose an algorithm to control the operation based on the result detected by the resonance strength detecting circuit 11 with defining a time when the lamp voltage becomes equal to or greater than the predetermined value or a time when a predetermined period has passed from starting the lighting operation as the basic point.

In this way, according to the high pressure discharge lamp lighting apparatus and the high pressure discharge lamp lighting method, after the control circuit switches the lighting frequency from the first frequency to the second frequency, the second frequency is decreased gradually or continuously according to the increase of the lamp voltage. Accordingly, there is no need to dynamically switch the frequency from starting the lighting up to reaching the steady state lighting, which enables to obtain the rising feature of the luminous flux without visually uncomfortable feeling.

In the foregoing first through eighth embodiments, a half bridge circuit is employed for a high frequency power supplying means; however, a circuit other than the half bridge circuit can be used as long as it supplies the high frequency power such as a push-pull circuit, a single-ended voltage resonance circuit, a full-bridge circuit, etc.

INDUSTRIAL APPLICABILITY

According to the present invention, the high pressure discharge lamp lighting apparatus, even if the resonance-free frequency band is moved by aging of the high pressure discharge lamp, etc., can supply the high frequency power having the intermediate frequency of the range to the high pressure discharge lamp, which prevents generation of "dying out" or "instabilities" of the discharge arc inside the arc tube and enables to light the high pressure discharge lamp in a steady state.

What is claimed is:

1. A high pressure discharge lamp lighting apparatus comprising:

a high pressure discharge lamp;

a lamp voltage detecting means for detecting a lamp voltage of the high pressure discharge lamp;

a high frequency power supplying means for supplying high frequency power to the high pressure discharge lamp;

a control circuit for controlling a frequency of the high frequency power supplied by the high frequency power supplying means, wherein the control circuit includes an extracting means for extracting an upper limit frequency and a lower limit frequency of resonance-free frequency band, and a frequency moving means for changing the frequency of the high frequency power in a range defined by the upper limit frequency and the lower limit frequency, and for moving the frequency to a frequency determined based on the upper limit frequency and the lower limit frequency.

2. A high pressure discharge lamp lighting apparatus comprising:

a high pressure discharge lamp;

a high frequency power supplying means for supplying high frequency power to the high pressure discharge lamp;

a control circuit for controlling a frequency of the high frequency power supplied by the high frequency power supplying means, wherein the control circuit includes:

a frequency storing means for storing a first frequency of a point when a lamp voltage of the high pressure discharge lamp begins increasing when the frequency of the high frequency power is made to decrease after the high pressure discharge lamp is lit at a predetermined frequency and a second frequency of a point when the lamp voltage of the high pressure discharge lamp begins increasing when the frequency of the high frequency power is made to increase; and a frequency moving means for moving the frequency of the high frequency power to a third frequency which is determined based on the first frequency and the second frequency stored in the frequency storing means.

3. The high pressure discharge lamp of claim 2, wherein the control circuit limits a moving range of a series of decreasing the frequency of the high frequency power after the high pressure discharge lamp is lit at a predetermined frequency, increasing the frequency of the high frequency power, and moving the frequency of the high frequency power to a lighting frequency which is determined based on the frequencies.

4. The high pressure discharge lamp of claim 2, wherein the frequency moving means repeatedly performs a series of operation of moving the frequency of the high frequency power at a predetermined interval.

5. The high pressure discharge lamp of claim 2, wherein the control circuit sets the predetermined frequency of the point when the high pressure discharge lamp is lit so as to match a lighting frequency of a previous lighting before turning-off.

6. A high pressure discharge lamp lighting apparatus having:

a high pressure discharge lamp;

a high frequency power supplying means for supplying high frequency power to the high pressure discharge lamp;

a control circuit for controlling a frequency of the high frequency power supplied by the high frequency power supplying means, wherein the control circuit includes:

a lamp voltage storing means for storing a lamp voltage of a point when the high pressure discharge lamp is lit at a predetermined frequency;

a frequency storing means for storing a first frequency of a point when the lamp voltage of the high pressure discharge lamp exceeds the lamp voltage stored in the lamp voltage storing means in case that the frequency of the high frequency power is made decrease and a second frequency of a point when the lamp voltage of the high pressure discharge lamp exceeds the lamp voltage stored in the lamp voltage storing means in case that the frequency of the high frequency power is made increase; and a frequency moving means for moving the frequency of the high frequency power to a third frequency which is determined based on the first frequency and the second frequency stored in the frequency storing means.

7. A high pressure discharge lamp lighting apparatus comprising:

a high pressure discharge lamp;

a lamp voltage detecting means for detecting a lamp voltage of the high pressure discharge lamp;

a high frequency power supplying means for supplying high frequency power to the high pressure discharge lamp;

a control circuit for controlling a frequency of the high frequency power supplied by the high frequency power supplying means, and wherein the high pressure discharge lamp lighting apparatus lights the high pressure discharge lamp in a steady state within a particular frequency range and a particular voltage range of a resonance-free region which is determined by the lamp voltage and a resonance-free frequency band corresponding the lamp voltage, a resonance strength detecting means for detecting rate of a instabilities of discharge arc due to acoustic resonance phenomena based on a change of the lamp voltage detected by the lamp voltage detecting means, and wherein the high pressure discharge lamp applies a first frequency which is lower than a maximum frequency of the particular frequency range as a lighting frequency at lighting time, and wherein when the resonance strength detecting means detects the instabilities of the discharge arc which exceeds a predetermined rate accompanied to increase of the lamp voltage after lighting, the control circuit increases the lighting frequency by a predetermined amount from the first frequency and switches the lighting frequency to a second frequency which belongs to the resonance-free region.

8. The high pressure discharge lamp lighting apparatus of claim 7, wherein when the resonance strength detecting means does not detect the instabilities of the discharge arc which exceeds the predetermined rate even if a predetermined time has passed since starting lighting operation, the control circuit forcibly switches the lighting frequency from the first frequency to the second frequency.

9. The high pressure discharge lamp lighting apparatus of claim 7, wherein after switching the lighting frequency from the first frequency to the second frequency, the control circuit gradually or continuously decreases the second frequency in respect of an increase of the lamp voltage.

10. The high pressure discharge lamp of claim 9, wherein the control circuit performs an operation of gradually decreasing the second frequency by repeatedly decreasing the lighting frequency by a predetermined amount when the resonance strength detecting means detects the instabilities of the discharge arc which exceeds the predetermined rate accompanied to an increase of the lamp voltage.

11. The high pressure discharge lamp of claim 9, wherein the control circuit performs an operation of gradually decreasing the second frequency by decreasing the lighting frequency and then repeatedly increasing the lighting frequency by the predetermined amount with a predetermined interval when the resonance strength detecting means detects the instabilities of the discharge arc which exceeds the predetermined rate accompanied to a decrease of the tube lighting frequency.

12. The high pressure discharge lamp of claim 9, wherein the control circuit performs an operation of continuously decreasing the second frequency by controlling to decrease the lighting frequency with approximately fixed changing rate in respect of an increase of the lamp voltage.

13. A high pressure discharge lamp lighting apparatus comprising:

a high pressure discharge lamp;

a lamp voltage detecting means for detecting a lamp voltage of the high pressure discharge lamp;

a high frequency power supplying means for supplying high frequency power to the high pressure discharge lamp;

a control circuit for controlling a frequency of the high frequency power supplied by the high frequency power supplying means, and wherein the high pressure discharge lamp lighting apparatus lights the high pressure discharge lamp in a steady state within a particular frequency range and a particular voltage range of a resonance-free region which is determined by the lamp voltage and a resonance-free frequency band corresponding to the lamp voltage, a resonance strength detecting means for detecting rate of instabilities of a discharge arc due to acoustic resonance phenomena based on a change of the lamp voltage detected by the lamp voltage detecting means, and wherein the high pressure discharge lamp applies a first frequency which is lower than a maximum frequency of the particular frequency range as a lighting frequency at lighting time, and wherein when the lamp voltage detecting means detects one of that the lamp voltage exceeds a predetermined value after lighting and that a predetermined time has passed since a lighting operation has started, the control circuit increases the lighting frequency by a predetermined amount from the first frequency and switches the lighting frequency to a second frequency which belongs to the resonance-free region.

14. A high pressure discharge lamp lighting apparatus comprising:

a high pressure discharge lamp;

a lamp voltage detecting means for detecting a lamp voltage of the high pressure discharge lamp;

a high frequency power supplying means for supplying high frequency power to the high pressure discharge lamp;

a control circuit for controlling a frequency of the high frequency power supplied by the high frequency power supplying means, and wherein the high pressure discharge lamp lighting apparatus lights the high pressure discharge lamp in a steady state within a particular frequency range and a particular voltage range of a resonance-free region which is determined by the lamp voltage and a resonance-free frequency band corresponding to the lamp voltage, a resonance strength detecting means for detecting rate of instabilities of a discharge arc due to acoustic resonance phenomena based on a change of the lamp voltage detected by the lamp voltage detecting means, and wherein the high pressure discharge lamp applies a first frequency which is lower than a maximum frequency of the particular frequency range as a lighting frequency at lighting time, wherein when the resonance strength detecting means detects the instabilities of the discharge arc which exceeds a predetermined rate according to increase of the lamp voltage after lighting, the control circuit decreases the lighting frequency by a predetermined amount from the first frequency and switches the lighting frequency to a second frequency which belongs to the resonance-free region and makes the second frequency gradually or continuously decrease in respect of the increase of the lamp voltage within the resonance-free region.

15. A high pressure discharge lamp lighting apparatus comprising:

a high pressure discharge lamp;

a lamp voltage detecting means for detecting a lamp voltage of the high pressure discharge lamp;

a high frequency power supplying means for supplying high frequency power to the high pressure discharge lamp;

a control circuit for controlling a frequency of the high frequency power supplied by the high frequency power supplying means, and wherein the high pressure discharge lamp lighting apparatus lights the high pressure discharge lamp in a steady state within a particular frequency range and a particular voltage range of a resonance-free region which is determined by the lamp voltage and a resonance-free frequency band corresponding to the lamp voltage, a resonance strength detecting means for detecting rate of instabilities of a discharge arc due to acoustic resonance phenomena based on a change of the lamp voltage detected by the lamp voltage detecting means, and wherein the high pressure discharge lamp applies a first frequency which is lower than a maximum frequency of the particular frequency range as a lighting frequency at lighting time, and wherein when the lamp voltage detecting means detects one of that the lamp voltage exceeds a predetermined value after lighting and that a predetermined time has passed since a lighting operation has started, wherein when the resonance strength detecting means detects the instabilities of the discharge arc which exceeds a predetermined rate according to an increase of the lamp voltage after lighting, the control circuit decreases the lighting frequency by a predetermined amount from the first frequency and switches the lighting frequency to a second frequency which belongs to the resonance-free region and makes the second frequency gradually or continuously decrease in respect of the increase of the lamp voltage within the resonance-free region.

16. A high pressure discharge lamp lighting apparatus having:

a high pressure discharge lamp;

a lamp voltage detecting means for detecting a lamp voltage of the high pressure discharge lamp;

a high frequency power supplying means for supplying high frequency power to the high pressure discharge lamp;

a control circuit for controlling a frequency of the high frequency power supplied by the high frequency power supplying means, and wherein the high pressure discharge lamp lighting apparatus lights the high pressure discharge lamp in a steady state within a particular frequency range and a particular voltage range of a resonance-free region which is determined by the lamp voltage and a resonance-free frequency band corresponding to the lamp voltage, wherein the high pressure discharge lamp applies a first frequency which is higher than a maximum frequency of the particular frequency range as a lighting frequency and decreases the lighting frequency at approximately fixed rate so as to stay within the resonance-free region in respect of an increase of the lamp voltage.

17. A method for a high pressure discharge lamp lighting having:

a high pressure discharge lamp;

a lamp voltage detecting step for detecting a lamp voltage of the high pressure discharge lamp;

a high frequency power supplying step for supplying high frequency power to the high pressure discharge lamp;

a control step for controlling a frequency of the high frequency power supplied by the high frequency power supplying means, the method further comprising:

an extracting step for extracting an upper limit frequency and a lower limit frequency from a resonance-free frequency band, wherein the control step changes a frequency of the high frequency power within a range defined by the upper limit frequency and the lower limit frequency of the resonance-free frequency band extracted by the extracting means, and then moves to a predetermined frequency which is determined based on the upper limit frequency and the lower limit frequency.

* * * * *